(12) United States Patent
Barclay et al.

(10) Patent No.: US 10,612,668 B1
(45) Date of Patent: Apr. 7, 2020

(54) ROTARY SEAL FACILITATING FLUID FLOWS THROUGH A ROTATING TOROIDAL MASS WITHIN A PRESSURIZED HOUSING VESSEL

(71) Applicant: Emerald Energy NW, LLC, Bothell, WA (US)

(72) Inventors: John A. Barclay, Bothell, WA (US); Corey C. Archipley, Lynnwood, WA (US); Tadeusz Szymanski, Lynnwood, WA (US)

(73) Assignee: EMERALD ENERGY NW, LLC, Bothell, WA (US)

( * ) Notice: Subject to any disclaimer, the term of this patent is extended or adjusted under 35 U.S.C. 154(b) by 0 days.

(21) Appl. No.: 16/025,906

(22) Filed: Jul. 2, 2018

Related U.S. Application Data

(60) Provisional application No. 62/528,361, filed on Jul. 3, 2017.

(51) Int. Cl.
*B01D 53/00* (2006.01)
*F16J 15/447* (2006.01)
(Continued)

(52) U.S. Cl.
CPC .............. *F16J 15/447* (2013.01); *F25B 21/00* (2013.01); *B01D 33/067* (2013.01); *B01D 53/00* (2013.01); *F25B 2321/0022* (2013.01)

(58) Field of Classification Search
CPC . F16J 15/447; F25B 21/00; F25B 2321/0022; B01D 53/00; B01D 33/067
See application file for complete search history.

(56) References Cited

U.S. PATENT DOCUMENTS 2,004,563 A * 6/1935 Bogoslowsky ......... F01C 1/344
  418/141
2,349,838 A * 5/1944 Alexandersson ........ G01B 3/18
  33/556
(Continued)

FOREIGN PATENT DOCUMENTS

JP 2005069682 A * 3/2005 .............. F25B 21/00

OTHER PUBLICATIONS

Crane Co., "Flow of Fluids Through Valves, Fittings and Pipe," Technical Paper No. 410 M, 1982.
(Continued)

*Primary Examiner* — Eugene G Byrd
(74) *Attorney, Agent, or Firm* — Christopher A. Wiklof; Launchpad IP, Inc.

(57) ABSTRACT

Devices in which a toroidal mass rotates within a pressurized housing vessel, such as rotary wheel Active Magnetic Regenerative Refrigerators (AMRR) and Active Magnetic Regenerative Liquefiers (AMRL), are disclosed. Mechanical gap-type seal designs (e.g., labyrinth seal designs) for controlling (e.g., minimizing) and/or directing fluid flows in the space between a rotating torus and a stationary housing are disclosed. Additional features, such as the use of low friction surface coatings, the generation of low pressure gradients in high pressure heat transfer fluid transiting porous regenerative beds, and the use of pressure bladders to apply adjustable spring pressure to sealing surfaces are also disclosed and contribute to improved device efficiency and desired fluid flows.

20 Claims, 14 Drawing Sheets

(51) Int. Cl.
*F25B 21/00* (2006.01)
*B01D 33/067* (2006.01)

(56) References Cited

U.S. PATENT DOCUMENTS

| | | | | |
|---|---|---|---|---|
| 2,451,261 A | * | 10/1948 | Warren | F01K 3/265 60/657 |
| 2,690,869 A | * | 10/1954 | Brown | F04C 18/20 418/113 |
| 2,856,120 A | * | 10/1958 | Fawzi | F04C 18/20 418/141 |
| 2,963,307 A | | 12/1960 | Bobo | |
| 3,231,284 A | | 1/1966 | Peicki | |
| 3,333,856 A | | 8/1967 | Voitik | |
| 3,339,933 A | | 9/1967 | Foster | |
| 3,537,713 A | | 11/1970 | Matthews et al. | |
| 3,977,817 A | * | 8/1976 | Monteil | F01C 1/20 418/196 |
| 4,218,066 A | | 8/1980 | Ackermann | |
| 4,332,135 A | | 6/1982 | Barclay et al. | |
| 4,408,463 A | * | 10/1983 | Barclay | F25B 21/00 505/889 |
| 4,645,217 A | | 2/1987 | Honeycutt, Jr. et al. | |
| 4,678,113 A | | 7/1987 | Bridges et al. | |
| 5,032,068 A | * | 7/1991 | Kurherr | F01C 1/20 418/10 |
| 5,110,033 A | | 5/1992 | Noone et al. | |
| 5,385,409 A | | 1/1995 | Ide | |
| 5,603,510 A | | 2/1997 | Sanders | |
| 6,030,175 A | | 2/2000 | Bagepalli et al. | |
| 6,131,910 A | | 10/2000 | Bagepalli et al. | |
| 8,852,328 B2 | * | 10/2014 | Barclay | F28F 9/26 165/88 |
| 2008/0122183 A1 | | 5/2008 | Braun et al. | |
| 2015/0168030 A1 | * | 6/2015 | Leonard | F25B 21/00 62/3.1 |

OTHER PUBLICATIONS

D. Tipton et al., "Labyrinth Seal Analysis. vol. III—Analytical and Experimental Development of a Design Model for Labyrinth Seals," AFWAL-TR-85-2103, vol. III, Jan. 2986.

T.S. Kim et al., "Investigation of Leakage Characteristics of Straight and Stepped Labyrinth Seals," International Journal of Fluid Machinery and Systems, vol. 3, No. 3, Jul.-Sep. 2010.

L. Joubert, "Mathematical Modeling of Leakage Flow Through Labyrinth Seals," Potchefstroom University for Christian Higher Learning, Nov. 14, 2003.

S. Suryanarayanan, "Labyrinth Seal Leakage Equation," Texas A&M University, May 2009.

* cited by examiner

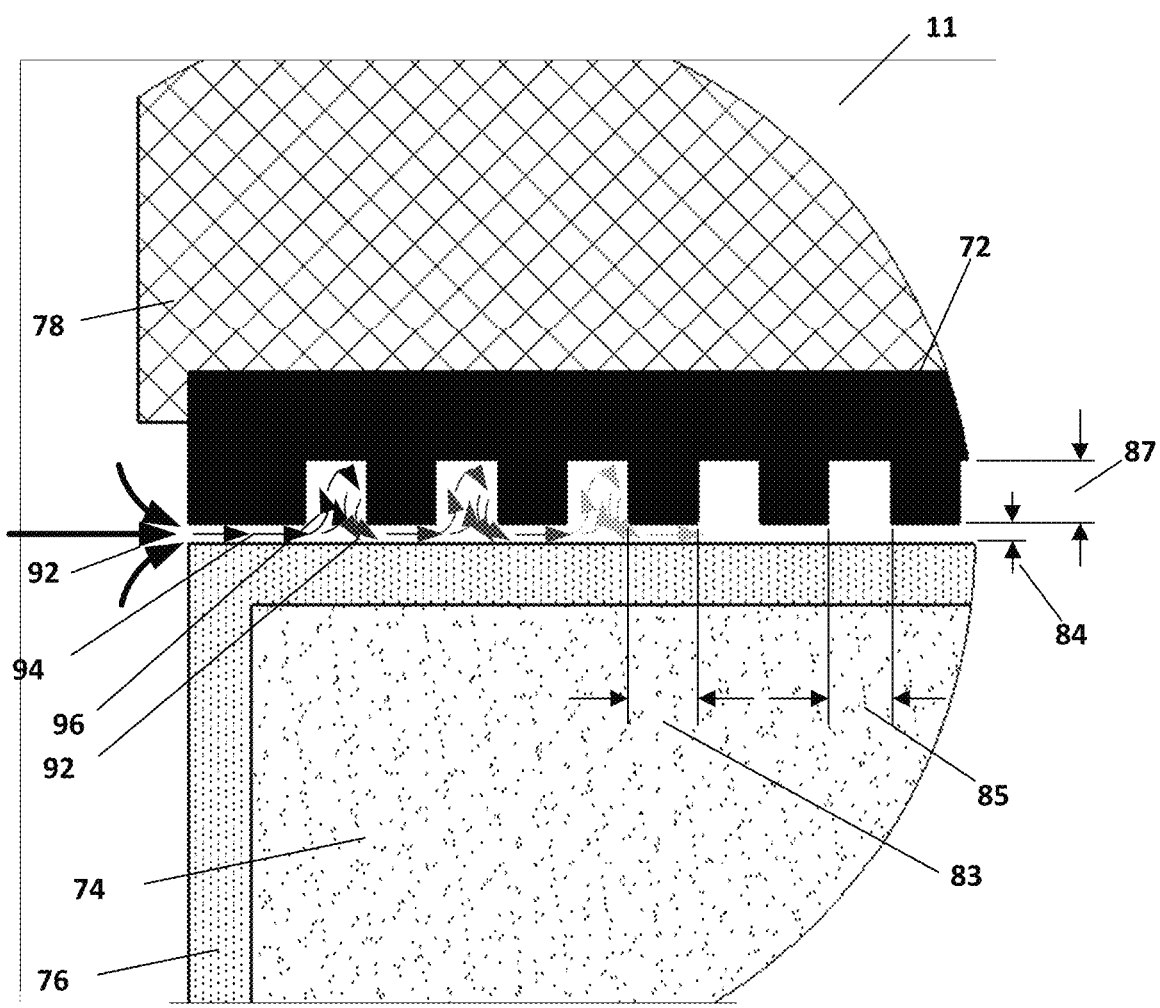

ROTARY SEAL FACILITATING FLUID FLOWS THROUGH A ROTATING TOROIDAL MASS WITHIN A PRESSURIZED HOUSING VESSEL

CROSS REFERENCE TO RELATED APPLICATIONS

This application claims the benefit of U.S. Provisional Application No. 62/528,361, filed Jul. 3, 2017, which is herein incorporated by reference in its entirety.

FIELD OF THE DISCLOSURE

The present disclosure relates to devices in which a toroidal mass rotates within a pressurized housing vessel, such as rotary wheel Active Magnetic Regenerative Refrigerators (AMRR) and Active Magnetic Regenerative Liquefiers (AMRL). In some aspects, the present disclosure relates to mechanical gap-type seals for controlling (e.g., minimizing) and/or directing fluid flows in the space between a rotating torus and a stationary housing. Mechanical gap-type seals may be implemented to reduce and/or direct heat transfer fluid flows in the space between a rotating torus comprising porous magnetic materials and its stationary housing in rotary wheel-type AMRR and AMRL apparatus.

BACKGROUND OF THE DISCLOSURE

Broad use of natural gas and hydrogen as fuels and energy carriers will provide the US with better energy security, return major economic, environmental, and health benefits, and will minimize the climate change impact of greenhouse gas emissions. Natural gas and hydrogen couple into any realistic model of the "renewable and sustainable natural gas-hydrogen-electricity economy" in an integrated and critical manner. For example, because of their relatively higher volumetric energy density and gravimetric energy density, liquid natural gas (LNG) and liquid hydrogen (LH2) are superior to compressed natural gas or hydrogen for cost-effective storage and delivery means to end users. Further, for aircraft, heavy-duty vehicles such as class 7/8 trucks, marine vessels, and train engines, LNG or LH2 are superior on-board fuel storage options compared to compressed gas storage techniques.

The ideal specific power input for a liquefier of a certain rate of cryogen production depends on the gas to be cooled and liquefied. The ratio of the ideal minimum work input per unit mass of gas to the real work input per unit mass of gas for a practical liquefier is called the figure of merit (FOM). Currently the majority of $LH_2$ is commercially liquefied via the nitrogen pre-cooled Claude cycle while LNG is primarily commercially liquefied by turbo-Brayton, cascade, or mixed refrigerant cycles. Existing large-scale conventional liquefiers for either cryogen can only achieve FOMs of ~0.35 and the FOMs decrease steadily for smaller-scale liquefiers. The increased price of these fuels due to low FOM presents a major technical barrier to the adoption of either LNG or $LH_2$.

There is a great need for more efficient and less expensive cryogen liquefaction methods. At smaller liquefier plants such as those needed to supply distributed refueling stations, this technology gap must be filled to enhance adoption of LNG and $LH_2$ into the US$675 billion/year transportation fuels market. Magnetic refrigeration based on the magnetocaloric effect was identified as a potential method for more efficient refrigeration because it uses solids rather than gases as refrigerants and magnetic field changes instead of gas pressure changes to create a thermodynamic cycle.

An early advancement toward efficient magnetic liquefiers was first disclosed by Barclay and Steyert (1982) in U.S. Pat. No. 4,332,135 wherein certain magnetic materials were simultaneously used as active refrigerants and thermal regenerators as an active magnetic regenerator (AMR). An AMR can be made to execute an active magnetic regenerative refrigeration cycle comprised of four steps: demagnetization of the AMR from high to low field with no heat transfer fluid flow; a hot-to-cold flow of heat transfer fluid at constant low field; magnetization of the AMR from low to high field with no fluid flow; and a cold-to-hot flow of heat transfer fluid at high field. After step 2 the cold heat transfer fluid absorbs heat from a thermal load before executing the cold to hot flow in step 4. The hot heat transfer fluid rejects heat to the heat sink after step 4 before it executes step 2. The required thermodynamic work for the AMR cycle is provided via differences in magnetic forces between magnetic materials in the regenerators and the high magnetic field as the materials enter and leave the field. Detailed analysis shows that good AMRL designs can achieve FOMs of 0.5-0.7 largely by eliminating large inefficiency of gas refrigerant compression typical of conventional hydrogen or natural gas liquefiers.

Currently, reciprocating dual regenerator AMRL designs dominate existing prototypes where piston-shaped layered magnetic regenerators are reciprocatively moved into and out of high magnetic field regions with reciprocating, intermittent heat transfer fluid flows phased to execute the heat transfer steps of the AMR cycle during flows axially through each porous regenerator. Reciprocating AMRL designs have inherent features that increase operational complexity. For example, each regenerator only provides cooling to an external thermal load or process stream load during heat transfer fluid flow from the hot end to the cold end of the demagnetized regenerator in one of four steps of an AMR cycle. To provide continuous cooling of a process stream in a liquefier, four different regenerators with movement phased 90° apart in and out of two solenoidal magnets must be integrated into an AMRL to sequentially provide continuous cooling of the process stream or other thermal loads. Further, the large magnetic forces between the magnetic regenerators and the magnetic field in reciprocating designs are difficult to react even in a dual regenerator configuration. Resultant heat generation in the persistent-mode magnets can overload the cryocooler used to keep magnets superconducting at about 4 K for NbTi, a widely used superconducting wire. The intermittent reciprocating heat transfer fluid flows and axial drive motions in reciprocating designs are increasingly difficult to implement as operating frequencies increase from 0.1-0.25 Hz to 1-2 Hz which is desirable to linearly increase cooling power per kg of refrigerant.

The complicating design features of reciprocating AMRLs can be eliminated by using a rotary regenerative wheel configuration. Wheel designs have a continuous rim comprised of one or more layers of porous ferromagnetic refrigerants with cascading Curie temperatures and means for continuously radially or axially flowing heat transfer gas only through sections of the rotating porous wheel rim in the high and low magnetic field regions and within a stationary hermetic housing. The simultaneous execution of all four steps of the AMR cycle at different sections of a rotating magnetic wheel within the stationary housing and fixed high and low magnetic fields naturally gives several significant AMRL design advantages.

Some advantageous features of rotary magnetic wheel AMRL designs were originally described by Barclay (1983) in U.S. Pat. No. 4,408,463A. Differentiating features include: i) steady-state temperatures varying from the heat rejection temperature $T_{HOT}$ to lowest cooling temperature $T_{COLD}$ occur at various locations in the AMRL; ii) continuous cooling is provided to external thermal loads and process loads in heat exchangers with continuous heat rejection in the hot exchanger; iii) steady pressures exist at any point in the heat transfer flow circuits with the highest pressure at discharge of the continuously circulating heat transfer fluid pump and lowest at the suction side of the pump; iv) attractive magnetic forces on segments of the magnetic wheel rotating out of the high magnetic field region are continuously reacted by slightly smaller attractive magnetic forces on segments of the magnetic wheel rotating into the high magnetic field region which gives AMR cycle thermodynamic work as a constant torque provided to rotate the magnetic wheel by a continuous drive mechanism; and v) the persistent mode superconducting magnets have fixed magnetic flux from the rotating magnetic material so the cryocooler thermal load to cool the magnets remains constant during the AMR cycle. Such features make continuous wheel type AMRL designs highly attractive for cryogen liquefaction applications for any temperature span from 4 K to 280 K.

However, the major challenge faced by the rotary wheel design is restricting primary heat transfer fluid flows between the rotating porous magnetic wheel and the stationary hermetic housing that contains the wheel. In short, a properly sealed rotary wheel AMRL device allows radial or axial heat transfer fluid flows through sections of rotating porous magnetic wheel within the high and low fields regions, while restricting undesirable leakage flow over, under, around, or circumferentially along the rotating bed in the small space between the rotating wheel and the stationary housing.

Solutions to restricting fluid flow between rotating surfaces have been in existence since the early 1900s. Applications include shaft seals for steam turbines and surface seals in many turbine-type devices such as steam and jet turbines. Early solutions were limited by material availability and manufacturing techniques. The need for more efficient aircraft turbine engines drove rotating seal advancement in the early 1960s. In U.S. Pat. No. 2,963,307, Bobo (1960) describes sealing axial pressure gradients using a combination of labyrinth and honeycomb surfaces to limit fluid flow across the seal even when materials respond to temperature driven eccentricities. In U.S. Pat. No. 3,231,284, Peickii et al. (1962) describe sealing pressure gradients across curved surface faces using low cost materials and manufacturing of this mechanical seal. In U.S. Pat. No. 3,339,933, Foster (1967) further improves on traditional axial-flow seal designs by incorporating a bonded high-temperature oxide material with thermal insulation characteristics onto one seal surface to reduce distortion and cracking in the seal region. Similarly, with U.S. Pat. No. 3,537,713, Matthews et al. (1970) describe using a rub-tolerant surface to mate with rotating labyrinth seals to help maintain a tight seal while limiting friction at the mating surface.

With U.S. Pat. No. 4,218,066, Ackermann (1980) advances surface seal techniques by implementing a canted, honeycomb cell surface with an abrasion resistant coating that increases aerodynamic resistance to flow across the seal. In U.S. Pat. No. 5,110,033, Noone et al. (1992) build upon early brush seal technology to accommodate thermal and centrifugal growth or displacement with a segmented design. Sanders (1997), in U.S. Pat. No. 5,603,510, discusses a specific variable clearance seal design that allows for seal gap clearances to adjust to changing structural dimensions. Patents U.S. Pat. Nos. 6,030,175A and 6,131,910A by Bagepalli et al. (2000) modernize previous annular seal designs by hybridizing labyrinth and brush seal techniques into one circumferential axial-flow seal for retrofitting existing labyrinth-only axial-seal systems and providing variable gap clearance needs associated with thermal and centrifugal displacement of rotating parts.

In terms of rotating face seals, or radial face seals, early attempts to seal shafts beyond the narrow annular type axial seals described above looked like Voitik's (1967) labyrinth-type face seal in U.S. Pat. No. 3,333,856. Finger seal arrangements adapted from Honeycutt, Jr. et al.'s (1987) sliding finger seal design in U.S. Pat. No. 4,645,217 and Bridges et al.'s (1987) brush seal design in U.S. Pat. No. 4,678,113 create a labyrinth type sealing surface shaped more like flat discs instead of early cylindrical designs. Ide (1995) in U.S. Pat. No. 5,385,409 develops a gap-type, non-contacting face seal that can accommodate seal face separation at startup to prevent damage to the seal faces before operational pressures are obtained. Braun at al.'s (2008) elegant hybridization of finger type axial and radial face seal in US Patent Application 2008/0122183 A1 leverages a multilayered labyrinth type approach.

Missing in the patent literature are solutions that provide means for sealing fluid flow in all three possible leakage paths within a free-space packing between a rotating torus and a stationary hermetic housing, including radial, axial, and circumferential leakage flows while allowing required primary axial or radial flows through the porous toroidal mass in certain regions of the its rotation. The present disclosure is directed, in part, to controlling and directing the fluid flow in leakage paths.

SUMMARY OF THE DISCLOSURE

In one aspect, the present disclosure relates to the configuration and design of active rotary magnetic regenerative refrigerators and liquefiers.

In another aspect, the present disclosure relates to providing active rotary magnetic regenerative refrigerators and liquefiers that increase the efficiency and lower the capital cost of liquefying cryogens such as liquid helium, liquid hydrogen, and liquid natural gas.

In another aspect, the present disclosure provides apparatus comprising a rotary toroid and stationary housing with components that substantially reduce fluid leakage flows (such as heat transfer flows) around the rotating toroidal mass (comprising, for example, porous segments of magnetic materials in toroidal magnetic regenerators) within flow regions of the torus during rotation (e.g., during an AMR cycle).

In yet another aspect, the present disclosure provides apparatus comprising a rotary toroid and stationary housing with components that substantially reduce fluid leakage flows (such as heat transfer flows) circumferentially in the small gaps between the stationary structure within a pressurized housing and the rotating toroid structure (comprising, for example, magnetic materials). In toroidal magnetic regenerators having these features, there may be both flow and no flow regions of the torus during an AMR cycle.

In another aspect, the present disclosure relates to a low friction labyrinth seal for facilitating fluid flow through a rotating torus in all possible flow paths. This design controls the magnitude of the pressure gradients and takes advantage of engineering seal gap dimensions and surface types to reduce contact friction while devising intentional leak paths through labyrinth-type surface seals that create a known and acceptable limited fluid leak across the seals in conjunction with a large radially or axially-oriented temperature gradient through the flow axis of a magnetic torus.

In yet another aspect, the present disclosure provides device designs that maintain close tolerances between stationary low-friction labyrinth seal structures and low friction surfaces of the rotating toroidal mass (e.g., magnetic regenerator torus).

In yet another aspect, the present disclosure provides device designs that reduce pressure differences for potential flows to a few psi by pressurizing the entire housing with fluid at a mean operating heat transfer fluid pressure, such as that required for efficient AMRL operation.

In AMRL designs with multilayered magnetic refrigerants combined into a single regenerator segment, there can be multiple different flows of heat transfer fluid. The primary flow through the porous regenerators is the largest and the most important to constrain. Another flow is the called bypass or imbalance flow which is taken from the cold primary flow circuit between the magnetized and demagnetized regenerators. Bypass flow is created by the ~10% greater heat capacity of a ferromagnetic refrigerant in low fields than high fields below the refrigerant's Curie temperature. This cold flow can be valve-controlled and can be contained in a hermetic pipe flow circuit through the process heat exchangers as it hermetically returns to the circulating pump. This cold flow can comprise up to ~10% of the primary flow. Diversion flows may be required to adjust primary flows through the layers of different refrigerants in multilayer regenerators. The diversion of a portion of the primary flow after each layer is required to adjust the heat transfer fluid flow through the next colder layer, and this flow portion is transferred to the corresponding thin space between the same layers in the other flow region of the wheel rotation. These flows can pass through hermetic channels around the circumference of the wheel in the dense foam structure and can be easily adjusted with small adjustable valves once the AMRL reaches steady-state operation.

Leakage flows of hot or cold primary heat transfer fluid around rather than through the regenerator segments of the torus in the flow regions of an AMR cycle thermally short circuit the regenerator and seriously reduce its cooling power and efficiency. In one aspect, this disclosure relates to gap-type seals configured to keep the leakage flows around the regenerators to <0.1% of the primary flow. Circumferential flow from higher to lower pressure in the clearance between the rotating torus and the stationary, close-fitting dense foam in the no-flow regions of the housing is also undesirable in most circumstances, so an effective seal desirably keeps such flow to <0.05% of the primary flow. The carry-over flow from entrained fluid within the rotary porous regenerator segments of the torus as they pass from the high or low field regions to the low or high field regions, respectively, is intrinsic. This effective flow depends upon on the device design parameters, such as density of heat transfer fluid, regenerator porosity, and frequency of rotation. As will be explained below, the major fluid flows in rotary devices as disclosed herein are the flows associated with primary flow through the rotating regenerator segments of the torus and circumferential flows in the no-flow regions of the torus.

Specific embodiments disclosed herein include a seal design for effectively controlling fluid flow through a rotating toroidal mass within a pressurized housing vessel. Using this type of rotary seal feature, controlled primary heat transfer fluid flow can be directed in the radial or axial directions through certain sections of the rotating toroidal mass (e.g., porous rotating toroidal regenerator) and any leakage flows are reduced to very small amounts. Design features for these embodiments may include one or more of the following features:

i) Low friction surface coatings for the rotating toroidal regenerative porous wheel and stationary labyrinth seal structure surfaces which the rotating torus travels through. Carbon-filled, glass-filled, or other-filled PTFE (Teflon) sold as various types of Rulon provide both structural integrity and low-friction surfaces for both mating slipping faces. Using these materials allows the stationary seal to rotating surface gap to be a thousandth of an inch or less and, in some embodiments, the stationary seal and rotating surfaces may touch. The use of a narrow gap reduces fluid flow (or seal leakage) to very small amounts by creating pressure drops for fluid flow.

ii) Labyrinth seal designs that dictate the direction and volume of seal leakage from high to low pressure regions. The use of labyrinth seals as disclosed herein provides limited and known leakage across moving surfaces with minimal surface-to-surface contact and therefor reduces friction during rotation of the wheel and reduces wear of the mating surfaces. Labyrinth seals operate by creating a pressure drop across the seal area due to fluid velocities increasing and decreasing as the fluid flows from one gap to the next. Given that leak paths are most likely occur where pressure gradients are the highest, the pressure drops created by labyrinth seals reduce the pressure gradients and therefore reduce the likelihood of a significant leak path developing across the entire seal surface. Where most labyrinth-type seals apply to an axial direction of flow, like those used in turbines, the rotary AMRL device creates pressure gradients in the radial and circumferential directions as well. Unique to our labyrinth seal design, by necessity, is the creation of labyrinth-induced pressure drops in multiple directions; radial, circumferential, and axial.

iii) By design, total pressure gradients across the porous regenerative bed are kept very low while bulk pressures are high enough to provide sufficient densities of the heat transfer fluid which is in the 100-1,000 psia range or higher. This is achieved by pressurizing the entire hermetic cavity that houses the rotating bed, the sealing structures, and drive structures. In doing so, effective fluid densities can be achieved to provide the thermal mass necessary to transfer heat into and out of the magnetic regenerative porous regenerators during the AMR cycle at 1-2 Hz. This method creates an environment where the pressure gradients are less 5-10 psia over the bulk pressure of the housing. This relatively low-pressure gradient from the inlet head to the bulk housing pressure is very manageable as compared to attempting to isolate the inlet manifold interface to the rotating bed from atmospheric pressure, which would be a ~115-~1,015 psia pressure gradient instead of 5-10 psia. In addition, the fluid that is used to pressurize the housing is also the heat transfer fluid. Therefore, there are no issues with leakage causing undesirable mixing effects.

iv) No continuous pathway within the pressurized cavity to allow fluid flow in any direction. By filling in any voids within the pressurized housing with rigid structural and cryogenically compatible insulating materials such as dense closed cell foam, any fluid that escapes beyond the seals containing the rotating bed has no pathway to travel in beyond the immediate vicinity of the leak location. Therefore, once the pressure of the localized area around the leak reaches the pressure of the region that the fluid is leaking from, the gradient causes the leak to become very small and leakage is reduced to acceptable low fractions of the primary flows.

v) Pressure bladders are used to apply adjustable spring pressure to stationary sealing surfaces to close off any gaps created by thermal contractions in the sealing structures that may result from substantial temperature gradients across the porous bed. The use of bladders instead of mechanical springs eliminates any cavities between the seal and spring mounts such that no leak paths occur around or through the spring region.

vi) A localized drive and bearing system in the no flow regions of the wheel creates a continuous rotational force on the rotating regenerator while not creating a continuous circumferential leak path. The design involves the use of positively engaged means to the low friction outer walls of the rotating wheel. The drive wheel has continuous drive means around its circumference at specific distances which align with the bed mounted force-transfer means as they come around in rotation. This creates a continuous drive force without any one continuous path for seal leakage to occur.

vii) Unlike many seal construction methods that ultimately use a very narrow surface to provide the sealing force (e.g., line seals), the labyrinth seal design uses only volume and surface seals throughout the AMR device. In this design, multiple sealing surfaces impede leakage without needing to apply large forces between the highly localized sliding parts and as a result, the seal region does not generate any significant frictional forces. This reduction in friction reduces the needed drive power and reduces the wear on all sliding parts.

viii) The junctions of stationary seal channel walls (in which the rotating bed travels) incorporate labyrinth structures and shaping that eliminate a leak path along this edge.

ix) While the device achieves cryogenic temperatures (sub 120 K), the region of the device at cryogenic temperatures is thermally isolated from the housing by cryogenic insulation, such as insulating rigid foam and the housing is fabricated from a highly insulative material, for example, of a high-pressure resin composite material such as a fiber resin laminate, e.g. G-10. Using a high-pressure resin composite material allows the large housing structure to operate at or near room temperature and avoids accommodating thermally driven expansion or contraction issues.

x) The AMRL design with the seals disclosed herein can be used for either single-layer or multi-layered magnetocaloric porous regenerators. In the case of multi-layered beds with different masses per layer, diversion flows of heat transfer gas can flow through small circumferential channels around the wheel in designated portions of the device from the demagnetized flow region to the magnetized flow region.

xi) Diversion flow is a key design feature of AMRLs to maximize layered-bed formats. Flow channels are integrated into the flow region to allow a desired fraction of the primary heat transfer fluid flow to be diverted from a specific layer in one flow region to the corresponding layer in the opposite flow region (on the layered segments located 180° opposite). The volume of diverted flow per layer is controlled by internal and external systems that interact with the diverted flow as it flows through isolated channels through the no-flow region of the device and does not interfere with the labyrinth seal operation.

xii) Bypass flow of the heat transfer fluid is highly beneficial for AMRLs that use ferromagnetic magnetic refrigerants operating about 10 Kelvin below their respective Curie temperatures where differences between heat capacity in high and low magnetic field cause different thermal masses. A hot to cold blow of helium or other heat transfer gas in the demagnetized regenerator allows a small percentage of the cold gas to be returned to a hotter temperature via process stream heat exchangers that cool a process stream to reduce temperature approaches and thereby significantly increase FOMs in AMRLs. This feature is easy to implement in rotary wheel AMRLs with the seals disclosed in this patent application.

Additional advantages and features of the apparatus and methods disclosed herein will be set forth in part in the description which follows, and in part will become apparent to those skilled in the art upon examination of the following or may be learned by practice of the disclosure.

BRIEF DESCRIPTION OF THE DRAWINGS

The disclosures herein are described in conjunction with the following drawings, in which like reference numerals designate like elements and wherein:

FIG. 4 is a partially schematic, detailed view of one embodiment of labyrinth seal construction in the flow region of the radial flow device where it mates with the rotating bed with leakage flow dynamics shown.

Figure 1:
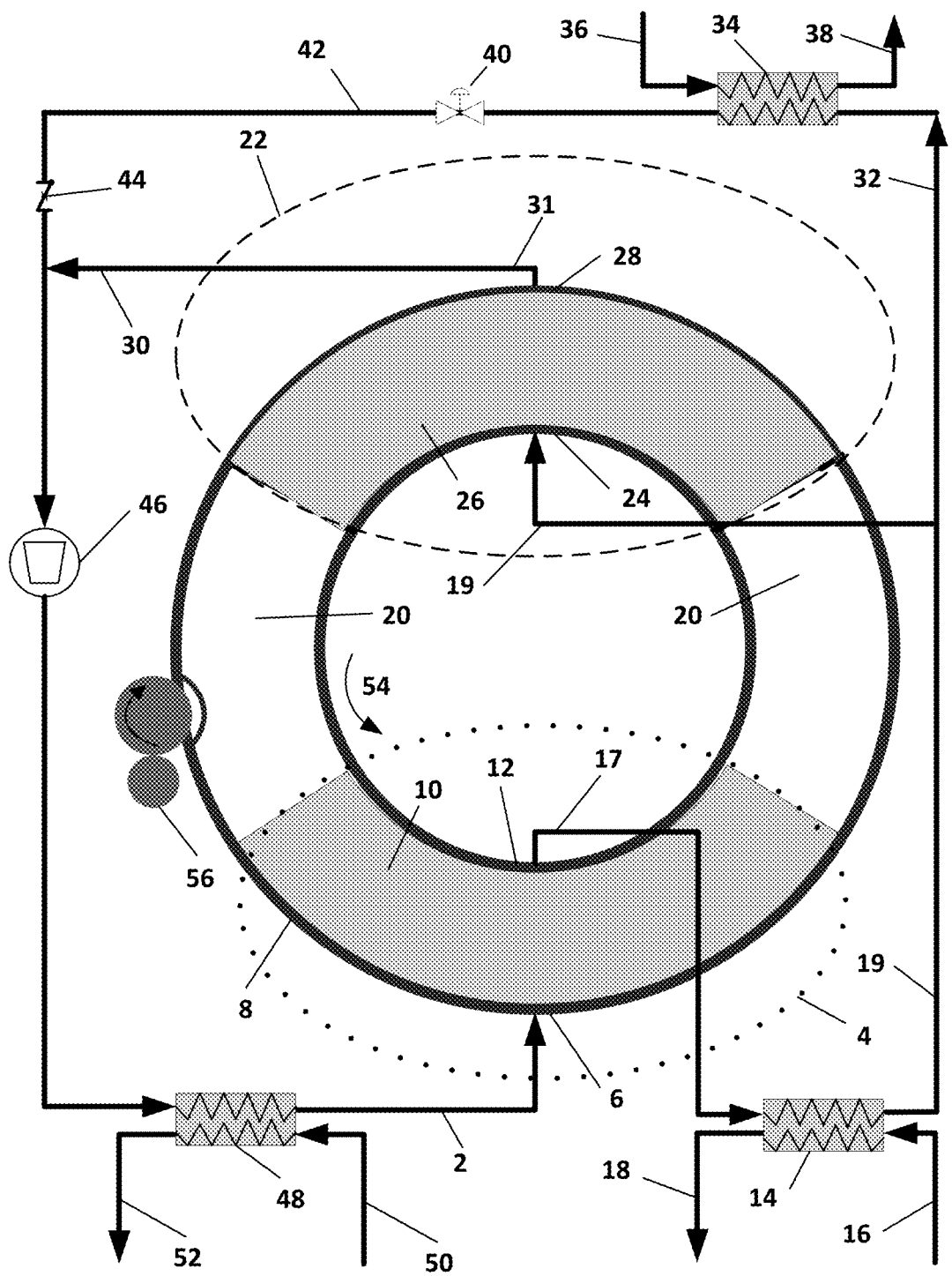
FIG. 1 is a partially schematic diagram of a single stage rotary wheel Active Magnetic Regenerative Refrigerator (AMRR) or Liquefier (AMRL) providing continuous cooling of a process stream and a heat load from another stage or device. Depicted are various heat transfer fluid flow pathways, heat exchangers, pumps, and valves associated with the rotary AMRR device. External regions and parts of the rotary device are labelled.

It will be understood that the appended drawings are not necessarily to scale, and that they present simplified, schematic views of many aspects of systems and components of the present invention. Specific design features, including dimensions, orientations, locations and configurations of various illustrated components may be modified, for example, for use in various intended applications and environments. It will also be appreciated that various features from one drawing may be omitted in alternative embodiments, and that various illustrated features may be used in combination with features from other drawings to provide additional embodiments, and that such combinations, whether resulting from omission or combination, are intended to be within the scope of the disclosure herein.

DETAILED DESCRIPTION OF THE DISCLOSURE

One application for rotary seals facilitating fluid flows through a rotating toroidal mass within a pressurized housing, as disclosed herein, are rotary wheel Active Magnetic Regenerative Refrigerators (AMRR) and Liquefiers (AMRL) providing continuous cooling of a process stream and a heat load from another stage or device, and detailed descriptions of these embodiments are described herein. It will be appreciated that the rotary seals and components of rotary seals, as described herein, and other features of the device as described herein with reference to AMRR and AMRL applications, are useful in other types of rotary device applications where fluid flow through a rotating mass contained within a pressurized housing is important, and application of the disclosure and claims is not limited to these particular embodiments.

At least three different classes of cryogenic AMRL designs have evolved during the past three decades. These include: i) a rotary toroidal regenerator of porous magnetic refrigerants with combinations of stationary superconducting magnets to create a high, nearly constant magnetic field region over an ~120° arc of the complete torus and a low, nearly constant magnetic field region over an oppositely-located ~120° arc of the complete torus; ii) a reciprocating dual regenerator of porous magnetic refrigerants with stationary superconducting solenoidal magnets with sufficient axial movement of each regenerator to move from high field to low field regions and vice versa; and iii) a stationary set of magnetic regenerators with moving magnets or charge/discharge magnets to alternatively create high and low magnetic field regions on each regenerator. The reciprocating dual regenerator design with a fixed superconducting magnet is the most common primarily because unresolved heat transfer fluid flow sealing challenges associated with complexity of heat transfer flows through the rotary magnetic torus in the high and low field regions and no flow in the two other field changing regions of the rotating torus.

The seal designs disclosed herein are suitable for use in rotary-wheel Active Magnetic Regenerative Refrigerators (AMRR) and Liquefiers (AMRL). In specific embodiments, the rotary wheel rim may comprise one or several layers of magnetic refrigerants that can be heated or cooled by the magnetocaloric effect from applied high or low field changes. In the rotary wheel embodiment, the rim rotates continuously at up to 1-2 Hz inside a stationary hermetic housing made of a structurally strong but poor thermal-conductivity material. In a single rotation, the wheel rotates through a ~120-degree section of the housing in a high magnetic-field region, through a 60-degree section of the housing where the field decreases from its high to low value, through a ~120-degree section of the housing in a low magnetic-field region, and then through a 60-degree section of the housing where the field increases from its low to high value. In the high-field region, a pressurized heat transfer fluid (HTF), such as helium gas at 500 psia, flows through the magnetic refrigerants from cold-to-hot temperatures. In the low-field region, the heat transfer fluid flows through the magnetic refrigerants from hot-to-cold temperatures. There is minimal flow of heat transfer fluid in the changing field regions.

As the wheel rotates, the magnetic refrigerants execute the AMR cycle. The heat transfer fluid coming out of the cold-to hot blow is hotter than $T_{HOT}$ and rejects heat into a sink at $T_{HOT}$. Similarly, the heat transfer fluid coming out of the hot-to-cold blow is colder than $T_{COLD}$ and absorbs heat (cold thermal energy) from a thermal load at $T_{COLD}$. The continuous flow of heat transfer fluid such as helium in cryogenic cooling applications such as liquefiers for $LH_2$ or LNG, is desirably constrained to flow radially or axially through the wheel rim comprised of porous magnetic refrigerants in the two flow regions, through the HTF circulating pump, through the HHEX and CHEX and through a bypass flow path and diversion flow paths as well. Seals desirably eliminate any flow over or under the rim of the rotating wheel, and around the circumference of the wheel in the no-flow regions. In one embodiment, seals disclosed herein comprise two-directional labyrinth seals positioned between stationary, coated surfaces of rigid insulation provided between the rotating wheel and the stationary housing and the rotating, coated surfaces of the rotating wheel. There are numerous pores in the coated surfaces on the inside and outside of the wheel rim to allow HTF flow into and out of the wheel as it rotates through two flow regions of the AMR cycle. In some embodiments, rigid separator sheets are located regularly, e.g., every 10°, within the rim to create porous magnetic refrigerant segments that eliminate circumferential flows around the rotating wheel but allow flow through the magnetic regenerator rim in the two flow regions.

Figure 2A:
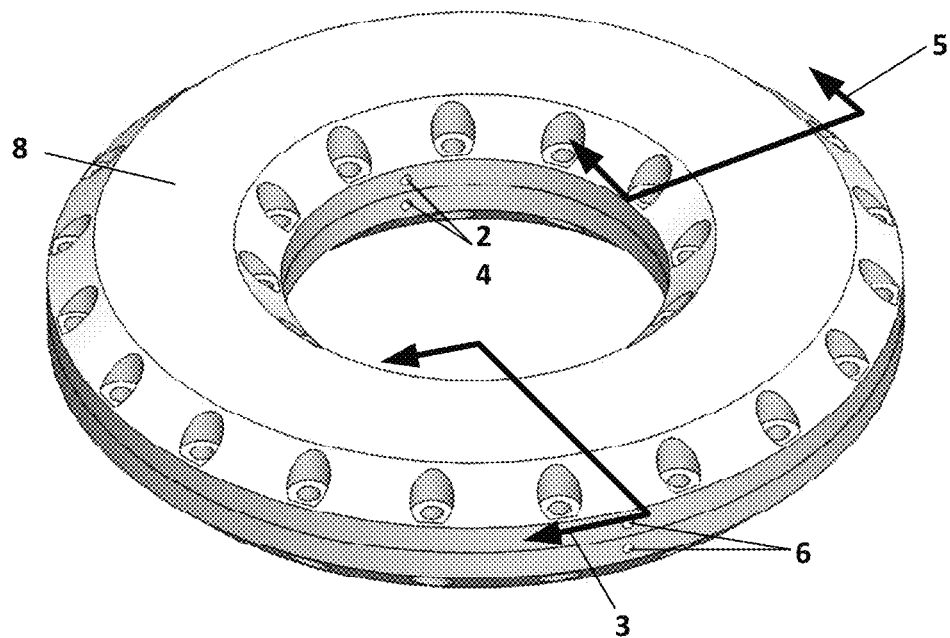
FIG. 2A is a partially schematic, three-dimensional illustration of the external portion of the housing for a rotary device for radial flow with heat transfer fluid ports and cross-section illustration cuts labelled.
Figure 2B:
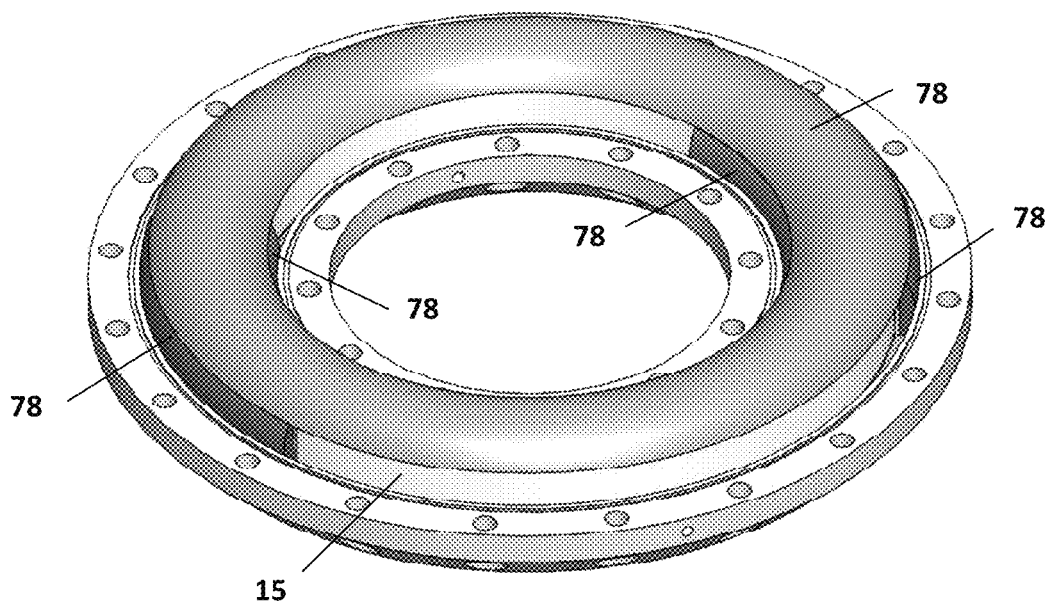
FIG. 2B is a partially schematic, three-dimensional illustration of the rotary device for radial flow as shown in FIG. 2A with the top portion of the housing removed, exposing the rigid foam insulation and the rotating wheel.
Figure 2C:
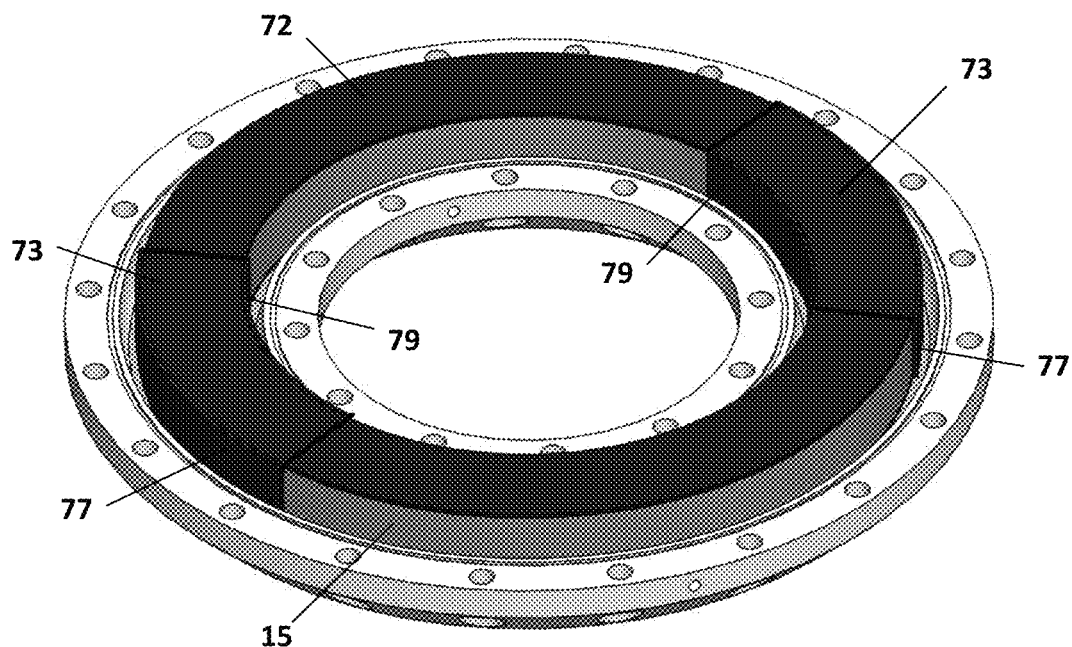
FIG. 2C is a partially schematic, three-dimensional illustration of the rotary device for radial flow as shown in FIGS. 2A and 2B, with the housing top and rigid foam insulation removed, exposing the low-friction labyrinth seal plates that mate with the rotating wheel.
Figure 2D:
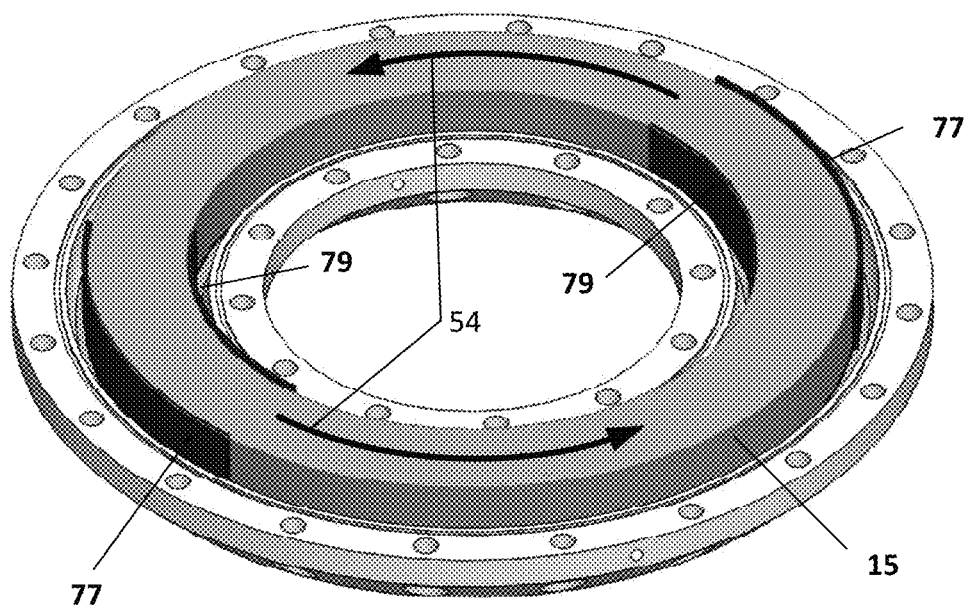
FIG. 2D is a partially schematic, three-dimensional illustration of the rotary device for radial flow as shown in FIGS. 2A-2C, with the housing top, rigid foam insulation, and the top low-friction labyrinth seal plate removed, exposing the rotating wheel with the direction of rotation noted.

The rotary toroid design illustrated in FIG. 1 inherently is a magnetic regenerator design capable of continuous execution of all four steps of an AMR cycle at different fixed locations around the magnetic refrigerant rim of the toroidal regenerator 15 shown in FIG. 2B, 2C, 2D. All temperatures in the stationary components of this type of AMRL design remain substantially constant in steady-state operation. The toroid drive motion in direction 54 is continuous, the cooling power is continuous, the magnetic forces between the rotating magnetic regenerators and the magnet via the magnetic field in region 22 are constant in time, the magnetic flux in the persistent-mode superconducting magnets are constant in time, heat transfer gas flow 30 through the pump 46 is continuous as is the bypass flow 32 of heat transfer gas which provides continuous cooling of the process gas stream 36. The total heat transfer fluid flow 2 through the magnetic regenerator rim in the rotating toroid is constant. The magnetic regenerator are the only dynamic feature of this design as they execute the AMR cycle at different locations around the toroid during toroid rotation. All of these attractive design factors enable an AMR cycle frequency of 1-2 Hz compared to 0.1-0.25 Hz in most reciprocating designs. Cooling capacity at $T_{COLD}$ is directly proportional to the rotational frequency so for a fixed process stream capacity, the amount of magnetic refrigerant required for a given cooling capacity decreases linearly with increasing rotational frequency. Magnetic refrigerants are one of two major cost components of an AMRL.

The high magnetic field region 22 for the top 120° section of the of the toroid can be provided by a set of superconducting solenoids combined to produce a constant high-field region. The path of the primary heat transfer fluid 2, bypass fluid 32, and process gas 36 are shown in FIG. 1. The stationary hermetic housing 8 is shown along with the seals between the rotating toroid of the layered magnetic regenerator segments and the stationary housing. The stationary hermetic housing 8 may comprise at least two portions (upper and lower portions, shown in FIG. 2A) comprising a high strength and highly insulative material. Materials such as fiberglass and carbon fiber resin composite materials, including G-10, are suitable for fabricating housing 8 for higher pressure heat transfer fluid applications. G-10 fiberglass epoxy composite and similar materials are preferred for construction of housing 8 because these materials have low thermal contraction similar to the magnetic refrigerants, high structural strength to withstand the cyclic compressive loading, insulative properties, poor thermal conductivity, and they are inexpensive and relatively easy to machine. The housing portions are sealable to one another to provide an internal volume in which a rotating toroidal mass is contained and may be penetrated by one or more inlet ducts 6 and outlet ducts 12.

The pressure of the heat transfer fluid inside the housing in AMRR and AMRL applications is constant and may be in ~300-1000 psia throughout. The heat transfer fluid flows radially 80 shown in FIG. 3B or axially 102 shown in FIG. 9B, depending on device design, in the hot-to-cold flow region 10 through the rotating regenerator 74 shown in FIG. 3A comprised of demagnetized porous magnetic refrigerant inside the low magnetic field region 4 of the toroid and likewise from cold-to-hot flow region 26 through the high magnetic field region 22 of the toroid. There is no flow in the two 60° sections of region 20 of the toroid where the magnetic field is decreasing or increasing. The two no-flow regions 20 are also where the rotating torus drive mechanism 56 and support bearings (not shown) are located. The pressure drop of the primary heat transfer fluid flows 10 in parallel through the several regenerator segments in the two flow regions is <5 psia by regenerator design, which establishes the differential pressure that must be maintained by seals.

Figure 6:
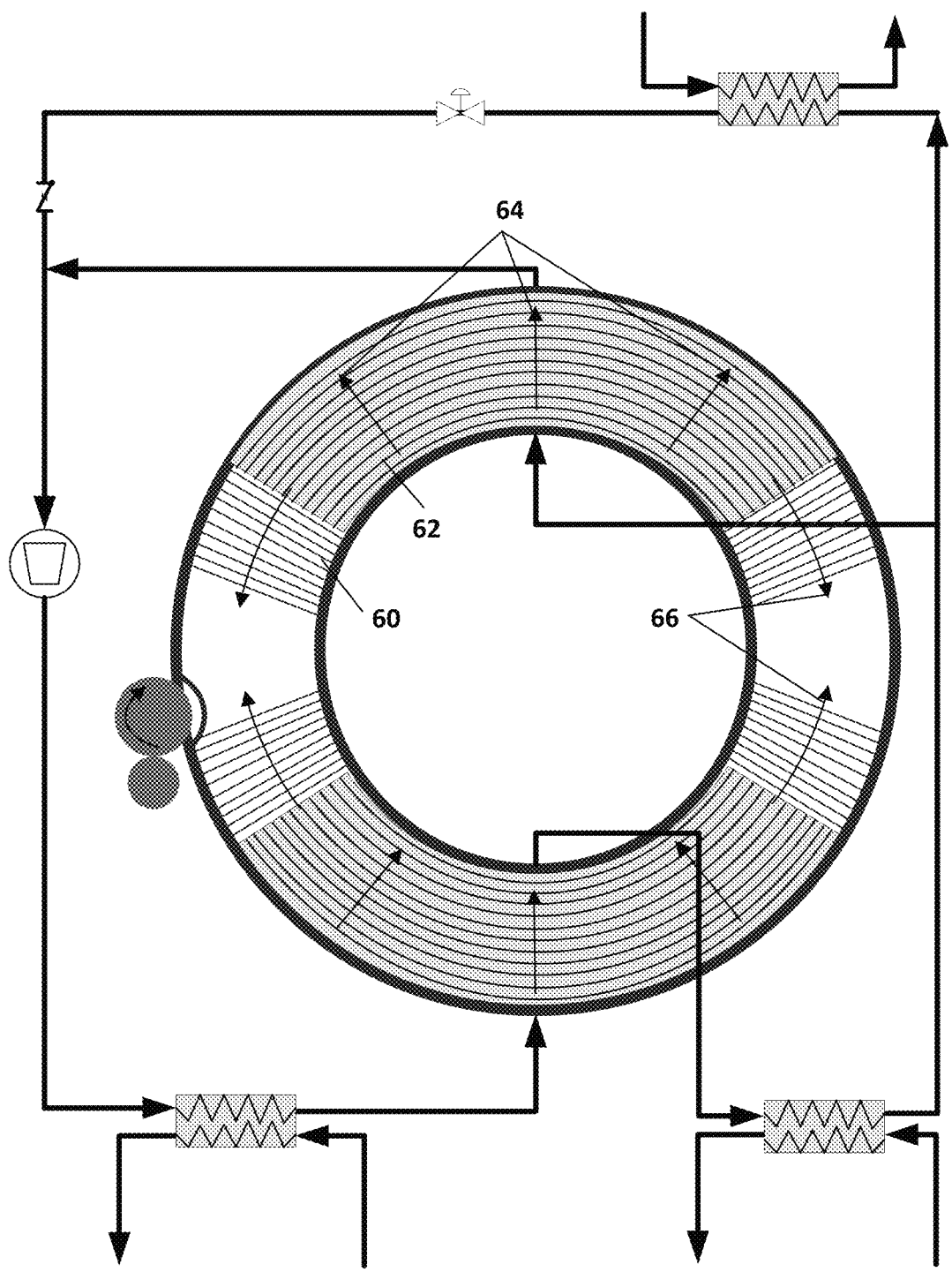
FIG. 6 is a block process diagram illustrating one embodiment of a radial flow rotary device depicting the direction of potential heat transfer fluid flow leakage and the orientation of the labyrinth structures to prevent this leakage.

The seals are an important component for successful operation of a pressurized rotary device because in the hot to cold and cold to hot flow regions 10 and 26, respectively, the primary heat transfer fluid must go through the regenerators and not over or under the toroid structure within the hermetic housing 8. Volume and surface seals 70 and 72 on bottom and top for radial flow design shown in FIGS. 2C, 3A, 3B, 4 and on the sides of the wheel 90 and 98 for axial flow design shown in FIGS. 8C, 9A, 9B are provided. In the no-flow regions 20 of the toroid, the seals are volume and surface seals that substantially eliminate any circumferential flows 66, as shown in FIG. 6. These seals control heat transfer fluid flow without creating high frictional loads between the rotating toroid and the stationary elements of the seals.

Figure 3A:
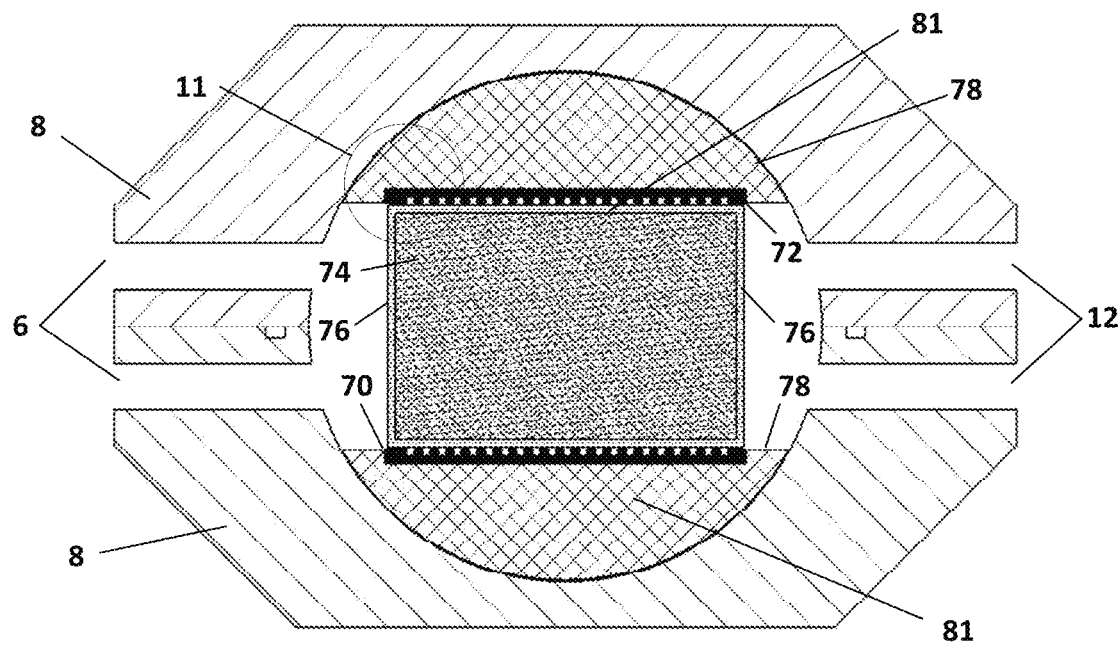
FIG. 3A is a partially schematic, cross-section illustration of the rotary device for radial flow in the heat transfer fluid flow region taken along line 3 of FIG. 2A, showing the housing, heat transfer fluid ports, insulation, labyrinth seal, and rotating bed components.

FIGS. 2B, 2C, 2D illustrate a complete magnetic torus 15 with mock-up porous regenerators 74 made using magnetic spheres of ~200-micron diameter with regenerator dimensions that fit into a toroidal structure 15. Toroidal regenerator structure 15 has a porous, low-friction coating 76 shown in FIG. 3A on its external moving surfaces with sufficient small holes to allow heat transfer fluid to flow through the toroid in the flow regions and a solid, low-friction coating 81 shown in FIG. 3A on its external surfaces where flow is not allowed as shown in FIGS. 3A, 4. Thin sheets of low-friction, PTFE-based material(s) such as Rulon may be used throughout the seal region for its structural integrity, ultralow friction, limited heat capacity, and low thermal conductivity properties. Compositions other than PTFE-based materials may be used, provided they have high structural integrity, low friction properties, limited heat capacity and low thermal conductivity. In some embodiments, low friction coating materials fully cover the toroidal surfaces that hold the porous magnetic beds 74 first shown in FIG. 3A.

FIG. 1 also shows the overall path of the heat transfer fluid (HTF) through the rotating torus AMR device. Starting with the heat transfer fluid entering the device at temperature $T_{HOT}$ 2 at inlet duct 6, the heat transfer fluid travels through the porous rotating torus 15 first shown in FIG. 2B in the low-magnetic field region 4 where the fluid warms the magnetocaloric material 74 cooled by the magnetocaloric effect. The fluid exits regenerator segments in this low-field, flow region at temperature $T_{COLD}-\Delta T_{COLD}$ 17 at exit duct 12 and travels to a heat exchanger 14 where it picks up heat from either another AMR stage or another external load such as parasitic heat leaks. FIG. 1 shows a heat transfer fluid stream 16 entering the heat exchanger 14 warmer than the fluid at 19 and warmer than fluid 12 as it exits the external heat exchanger at 18. The primary heat transfer fluid 19 from the external heat exchanger 14 is split where a small portion of the fluid 32 is bypassed and enters the cold process stream heat exchanger 34 at temperature $T_{COLD}$ 19 where is picks up heat as it cools a process stream. The process stream at 36 enters heat exchanger 34 at near temperature $T_{HOT}$ 2 and exits at 38 at near temperature $T_{COLD}$ 19. The bypass fluid travels through a valve 40 that controls the volume of bypass flow and a check valve 44 that prevents any possible backflow. Most of the primary heat transfer fluid is not bypassed and reenters the rotary magnetic torus at temperature $T_{COLD}$ 19 at inlet duct 24. It then travels through the porous rotating torus 15 in the high-magnetic field region 22 where the fluid picks up heat from the magnetocaloric material 74 that has been warmed by the magnetocaloric effect as the material entered the magnetic field. The heat transfer fluid exits the flow region of the magnetized regenerator at temperature $T_{HOT}+\Delta T_{HOT}$ 31 at housing fluid port 28. From here the primary heat transfer fluid and bypass fluid at nearly the same temperature are combined and passes through the fluid pump 46 to flow into a heat exchanger 48 where heat from the AMR cycle is passed to a chiller or another AMR stage. A chiller fluid or heat transfer fluid 50 enters the heat exchanger 48 at slightly less than temperature $T_{HOT}$ 2 and exits 52 the heat exchanger 48 at temperature near $T_{HOT}+\Delta T_{HOT}$ 31.

The shape of the rotating torus 15 can be rectangular or round in cross-section and, in some embodiments, other shapes may be implemented. The figures herein illustrate a rectangular cross-section design. Labyrinth seals as shown in FIG. 4 in the specific embodiments illustrated are arranged on the mated porous and non-porous low-friction seal surfaces 76 and 81 shown in FIG. 3A, respectively, such that leak paths can be managed and predicted by leveraging strategic pressure drop gradient vectors that improve seal integrity. In some embodiment, two different orientations of the labyrinth seal leak paths as shown in FIG. 6 are provided in the stationary surfaces of the housing cavity in different regions of the rotating toroid. In these embodiments for radial flow apparatus, for example, grooves in labyrinth elements providing leak paths are oriented circumferentially in the high and low magnetic field flow regions and leak paths, while grooves in labyrinth elements providing leak paths are oriented radially in the no flow regions of the apparatus. In some embodiments, the stationary low-friction channels (grooves) provided in labyrinth seal elements fully enclose the rotating toroid such that the seals largely eliminate any heat transfer fluid flow from traveling anywhere in the interior of the pressurized housing other than radially or axially through the porous regenerator bed (depending on design). This disclosure discusses two possible flow patterns within a rotating AMR device. The radial flow design has heat transfer fluid travelling through the porous rotating torus 15 radially, whereas the axial flow design has heat transfer fluid flowing axially through the porous rotating torus 15. Both embodiments of the seal are described further below.

FIG. 2 illustrates the radial flow embodiment beginning with FIG. 2A where the housing 8 (fabricated, for example from a resin laminate, such as a glass or carbon fiber resin laminate such as G-10 or like material) is depicted with the heat transfer fluid inlet ducts 6 and 24. FIG. 2B shows the radial flow design with the top housing removed exposing the rigid foam insulation 78 (or a similar high insulative material) that wraps around all internal components to limit parasitic heat leak into the magnetic regenerator from outside of the housing and prevents or substantially reduces passage of undesirable fluid flow within the housing. In FIG. 2C, 2D low-friction, labyrinth seal elements 72, 73 77, and 79 are attached below or on the side of the rigid foam insulation (not shown). The fully enclosing labyrinth seal elements 73, 77, and 79 are located within the no-flow regions of the radial flow apparatus to prevent circumferential flow from the hot-to-cold flow region 10 to the cold-to-hot-flow region 26. Top labyrinth seal element 72 and bottom labyrinth seal element 70 prevent fluid flow from going over the top or under the bottom of the rotating toroid regenerator bed 74 in the radial fluid flow regions of the apparatus. FIG. 2D shows the direction of rotation 54 (also shown in FIG. 1) of the rotating toroid 74 with the top labyrinth seal element 72 removed.

Figure 3B:
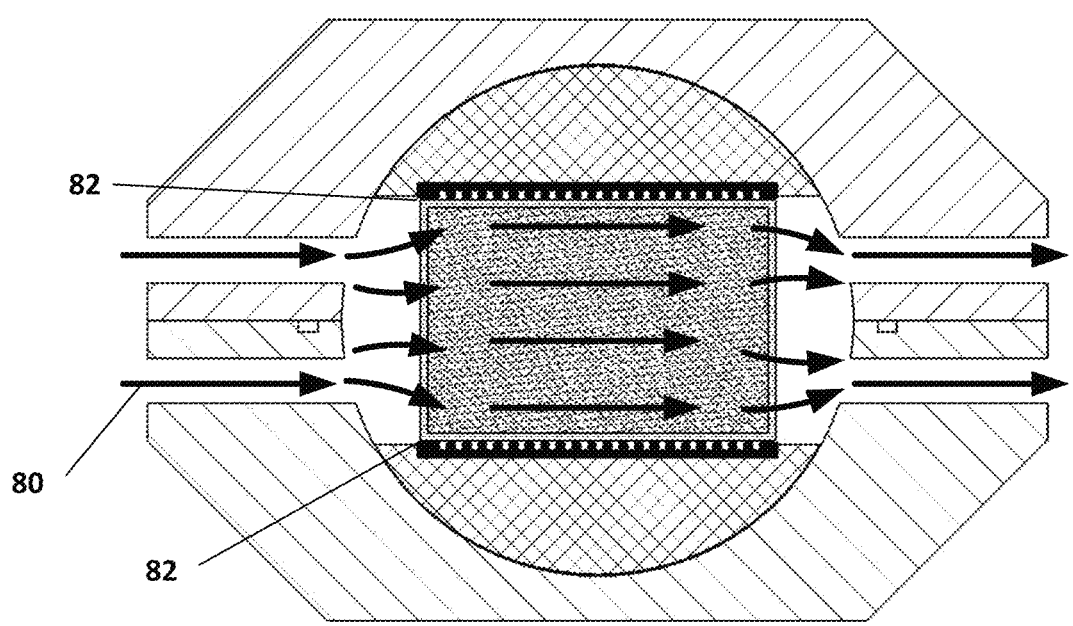
FIG. 3B is a partially schematic, cross-section illustration of the rotary device for radial flow in the heat transfer fluid flow region taken along line 3 of FIG. 2A showing fluid flow pathways and directions.

FIG. 3A is a cross-section view taken along line 3 of FIG. 2A and shows the internal structure of the exemplary radial flow design device in the flow regions. Both top and bottom labyrinth seal elements 70 and 72 are shown. The porous rotating torus 15 is shown with its low-friction coatings 76 and 81 as well as the porous magnetocaloric regenerator bed material 74. FIG. 3B is the same cross-section as FIG. 3A and shows the direction of radial heat transfer fluid flow 80 through the flow region of the radial flow designed device. Flow enters through first inlet duct 6 and penetrates the porous, low-friction sides 76 of the rotating torus 15, either picks up heat from or leaves heat in the magnetocaloric material 74 and exits through first outlet duct 12. The gaps 84 between the labyrinth seals 70 and 72 shown in FIG. 4 are potential leak paths 82 shown in FIG. 3B. These small gaps 84 are desirable for reducing friction as the torus 15 rotates within the seal structure. Friction requires both a higher force to rotate the torus 15, thus reducing the device efficiency, and results in premature wear of the sealing surfaces, leading to higher maintenance costs.

FIG. 4 illustrates more details of the labyrinth seal for the rotary torus AMRL design taken from circle 11 cut away in FIG. 3A for a cross section of radial hot to cold heat transfer fluid in the demagnetized flow region of the rotating wheel. The seal comprises an upper stationary seal element 72 comprising a PTFE-based material such as Rulon or other solid material having high structural integrity, low thermal expansion coefficient, and a low coefficient of friction firmly attached to insulative element 78 comprising, in some embodiments, a dense, closed cell, insulating foam. Top labyrinth seal element 72 has regularly spaced grooves or channels having a depth 87 and width 85 oriented perpendicular to the primary flow direction through the regenerator (i.e., oriented in a circumferential path in a radial flow apparatus). This arrangement provides a butte-shaped solid projection of material having width 83 and height 87 on both sides of each groove. The projections and grooves are machined or otherwise fabricated with dimensions chosen to establish three pressure-drop mechanisms for fluid flow 92 that enters seal channel with gap 84 between the low-friction coating or thin surface element 76 firmly attached to rotating porous magnetic wheel element 74.

In the illustrated embodiments, labyrinth seal elements may comprise from a few grooves, e.g. from at least about 5 grooves, to 12 or 15 more grooves. The grooves are regularly spaced in the illustrated embodiments and grooves in each labyrinth seal element have the same dimensions. It will be appreciated that labyrinth elements having grooves with different spacing and different dimensions may be used in some applications. In some embodiments, as shown, the grooves and projections have approximately the same dimensions and the gap dimension 84 is small compared to the groove depth 87. In some embodiments, the gap dimension is less than 50% the groove depth; in other embodiments, the gap dimension is less than 30% the groove depth; and in yet other embodiment, the gap dimension is less than 20% the groove depth.

This grooved structure produces a labyrinth seal that creates a pressure drop for heat transfer fluid flow 92 between the smooth, low friction coating 76 of the rotating wheel 74 and the structure of the stationary element of the seal 72. The labyrinth seal pressure drops are caused by i) normal fluid flow 94 through the narrow gap; ii) expansion of the fluid 96 as it flows into the cavity between two buttes and slows substantially; and iii) and compression of the fluid 92 as the flow accelerates substantially to conserve mass and leave the cavity between the two buttes to enter the next narrow seal channel gap 84 between the next butte and coating on the rotating wheel. The pressure drops from these three mechanisms cumulatively increase as additional groove-butte cavity elements are added until a small leakage fluid flow 94, e.g. 0.1% of the primary flow, produces a total pressure drop across the labyrinth seal equal to the pressure drop of primary heat transfer fluid flow radially through the porous regenerator segments 74 comprising the rotating magnetic torus in the flow section of the AMR cycle.

As an example of the effectiveness of the seal design disclosed herein in an AMRR or AMRL application, a MathCAD program was written to calculate the pressure drop of easily-achieved dimensions of a typical labyrinth seal between thin solid-filled Teflon surfaces on all sides of the rotating wheel rim and the solid-filled Teflon surfaces with labyrinth grooves attached to the stationary structure in the housing. The dimensions of the depth and width of the grooves selected were like those schematically shown in FIG. 4 with properties of helium at 200 psia and 295 K used for density and viscosity values were conservative compared to helium at 500 psia and lower temperatures. The expansion and contraction of flow in each cavity more than doubles pressure drop of flow in the gap between the rotating wheel and the stationary seal. By selecting the number of grooves and buttes, the desired pressure drop can be readily achieved. These calculations show a leak rate of less than 0.05% of the primary radial heat transfer gas flow through flow regions of a typical AMRL wheel when 1-2 psia pressure drop for mass flow rates of helium gas used in an AMRL with labyrinth seal gaps of ~0.005" between the rotating and stationary surfaces of filled Teflon. This gap dimension allows sufficient design flexibility to accommodate +/−0.001" tolerances and variations expected in the manufacture and assembly of rotary AMRL wheels.

A MathCAD program for calculating the labyrinth seal pressure drop for typical heat transfer gas flows in AMR wheels with small cooling power was run. The pressure drops of 1-D flow perpendicular to a labyrinth seal comprised of a narrow gap followed by a cavity of depth/width such that its volume/length is several times larger than the gap, where enough seal elements extend for a long length compared to the narrow gap (width) and the length of the flow path within the narrow gap is several times the gap. In this instance, the pressure drop is comprised of three components from flow through a narrow rectangular gap and flow through a rectangular cavity with a depth several times the length of the gap and length in the direction of flow approximately equal to the depth of the cavity. A mass of gas accelerates as it flows through the narrow gap, and then slows down as it expands into the cavity, before it reaccelerates to enter the next gap.

We assumed 36 regenerator segments comprise the wheel rim. Each segment was assumed to be 2" high on the inner diameter. Each radial flow region is provided over a 120-degree arc of the wheel rim, which put 12 segments in parallel for flow through the wheel rim and keeps pressure drop through the regenerators low. We assumed the mean pressure in the wheel housing was 200 psia and the heat transfer gas is helium. The porosity of the regenerator segments is 0.38 based on experience fabricating many regenerators. The average sphere diameter of the magnetic refrigerants in the monolithic regenerator segments was 200 microns, which is typical for balancing pressure drop with heat transfer surface area. Ambient temperature was taken as 295 K.

The coordinates are z in axial direction of the wheel rim, x in the circumferential direction of the wheel rim, and y in the radial direction of the rim. We chose to determine the pressure drop for a seal leakage flow rate of 0.008% of the primary radial flow of 10 gm/s helium gas through the 12 segments of magnetic regenerators. With each seal projection gap as 0.010" (z length) and cavity as 0.137" axially (y direction), and 0.0685" deep (z direction), and the 11 projections and 10 cavities of this dimension are initially chosen, the pressure drop of this size labyrinth seal is 1.05 psia. The pressure drop of the primary flow of 10 gm/s through the 12 regenerator segments in the complete parallel flow section of the wheel housing (continuously) gives a pressure drop of comparable magnitude. A leakage flow of less than 0.1% of the primary helium flow suggests this seal is a very versatile approach for a range of AMRL designs of different liquefier capacities and heat transfer fluid pressures. The ability to choose multiple dimensions for the seals in both the flow regions and the no-flow regions allows optimization of cost-performance of a critical seal for this type of apparatus.

Figure 5:
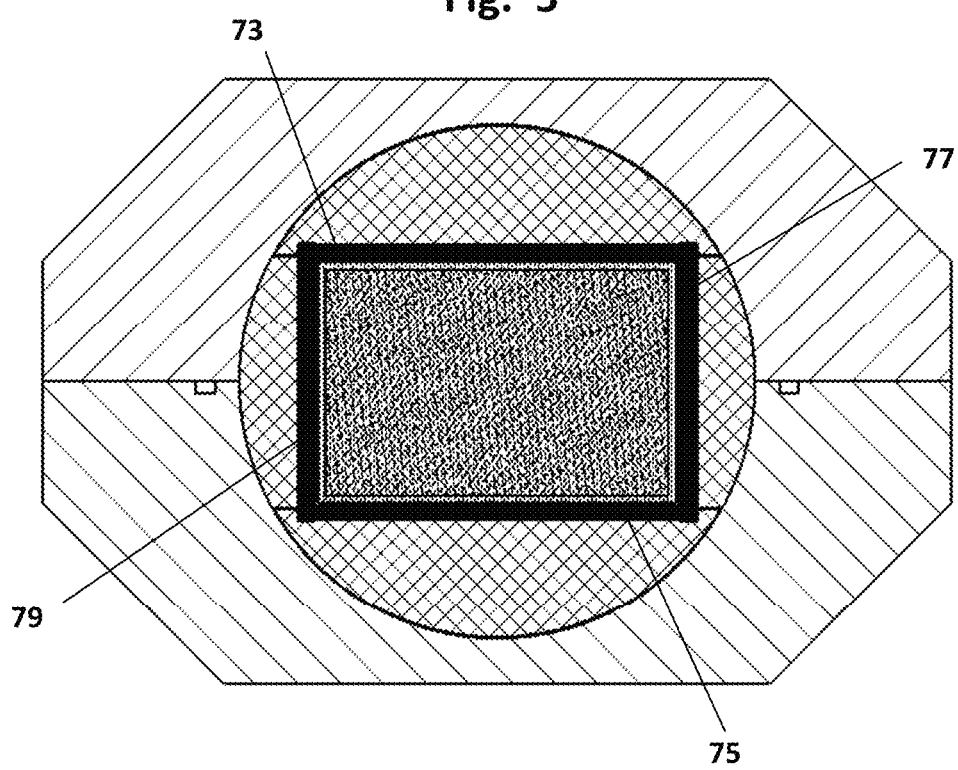
FIG. 5 is a partially schematic, cross-section illustration of the rotary device for radial flow in the no-flow region taken along line 5 of FIG. 2A, showing labyrinth seals for preventing heat transfer fluid leakage in circumferential directions.

FIG. 5 shows a cross-section 5 of the radial flow design in each of the two the no-flow regions 20, and FIG. 6 shows the orientation of labyrinth seal element grooves in the various regions of the torus. In these spaced apart 60° no flow regions 20 around the torus, the labyrinth elements 73, 75, 77, and 79 are positioned at all four surfaces (top, bottom and inside and outside side walls) of the torus and have grooves providing leak pathways that are perpendicular to the direction of any circumferential heat transfer fluid leakage such as 66. Thus, in the no radial fluid flow regions, the labyrinth element grooves located in proximity to the top and bottom surfaces of the torus are oriented radially, while labyrinth element grooves located in proximity to the (upstanding) side wall surfaces of the torus are oriented vertically. No-flow region(s) 20 also have rigid foam insulation 78 that fully encloses the labyrinth seal plates 73, 75, 77, and 79 such that any leaked heat transfer fluid that escapes beyond the seals has no region to travel into or fill thus creating a blockage of any leaked fluid that may escape the seal channels.

Figure 7A:
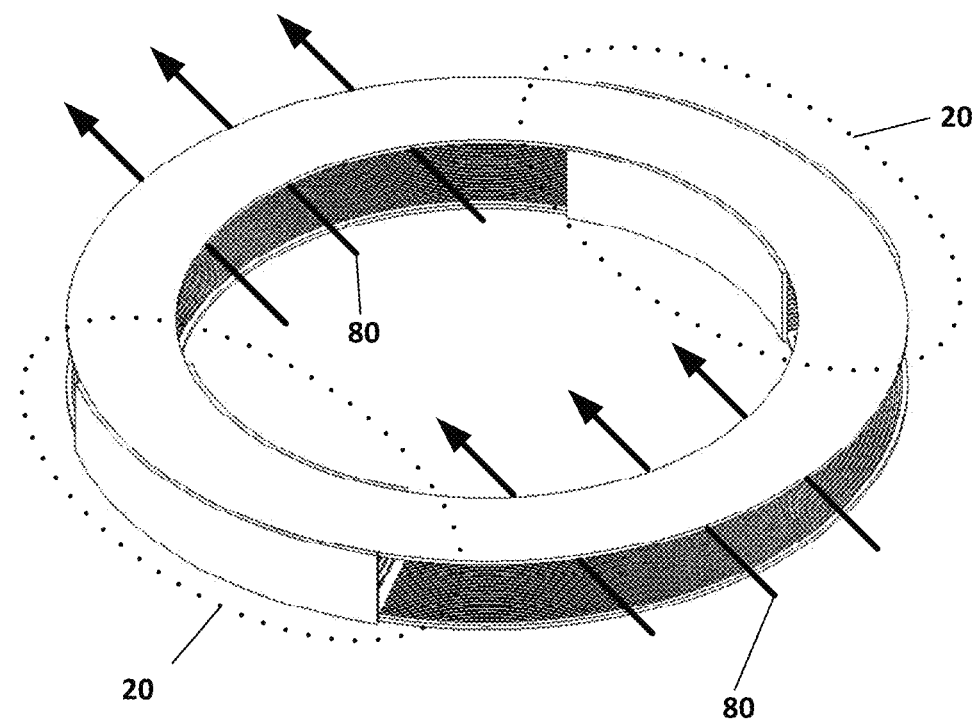
FIG. 7A is a partially schematic, three-dimensional illustration of labyrinth seal plates in the rotary device for radial flow with the direction and pathway of heat transfer fluid flow and the no-flow regions shown.
Figure 7B:
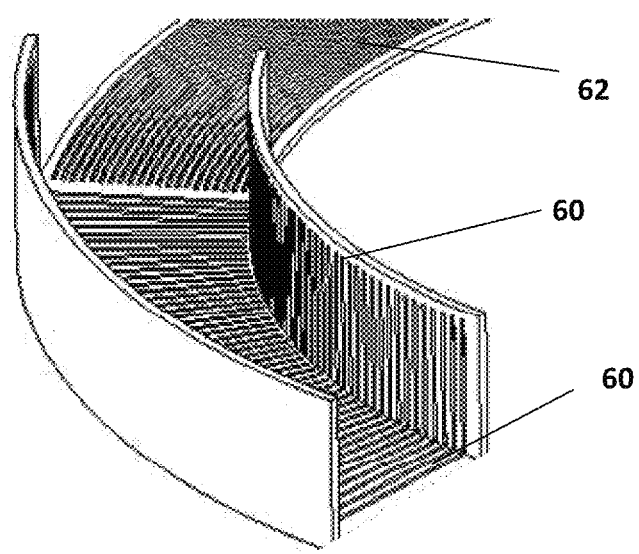
FIG. 7B is a partially schematic, three-dimensional illustration of one embodiment of labyrinth seal plates in a rotary device for radial flow with the orientation of the labyrinths in the flow and no-flow regions shown.

FIG. 6 shows various leakage directions that dictate the location and orientation of labyrinth seals. In the radial flow design, labyrinth seal elements positioned in proximity to the top and bottom surfaces of the rotating torus in the fluid flow regions have grooves 62 oriented perpendicular to the direction of heat transfer fluid flow 64 to prevent leakage over or under the rotating torus 15. The grooves of labyrinth seal elements in the no fluid flow regions are oriented radially on seal elements positioned in proximity to the top and bottom surfaces of the rotating torus and vertically on seal elements positioned in proximity to side wall surfaces of the rotating torus. FIG. 7A shows the labyrinth seal elements, with the rotating torus 15 removed from the illustration, the primary flow direction 80 of the heat transfer fluid through the radial flow designed device. The enclosed section in the no-flow region 20 is shown in more detail in FIG. 7B, where the proper orientation 60 to prevent leakage 66 in the no-flow region shown as well as the proper orientation 62 to prevent leakage over or under 64 the rotating torus 15.

Figure 8A:
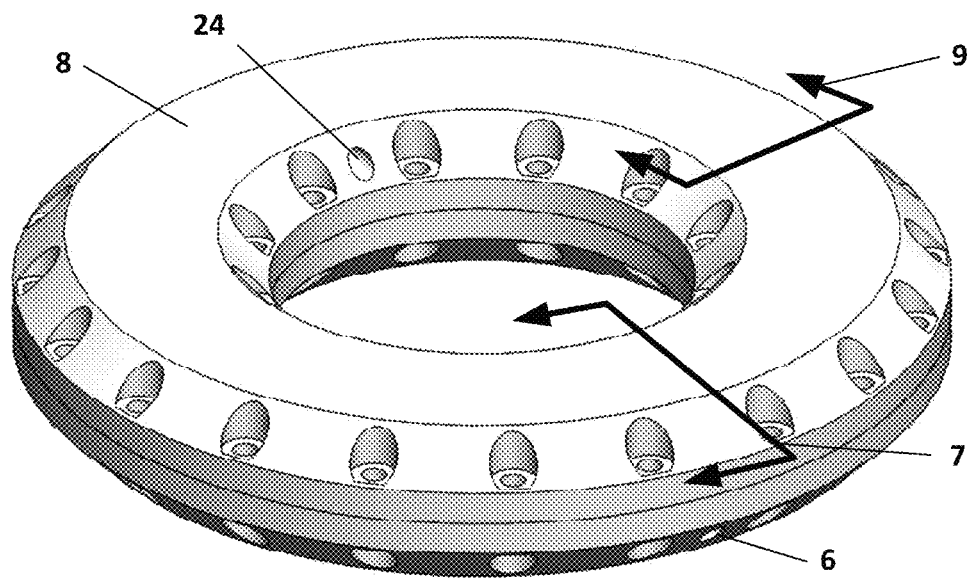
FIG. 8A is a partially schematic, three-dimensional external view of a rotary device for axial flow housing with heat transfer fluid ports and cross-section illustration cuts labelled.
Figure 8B:
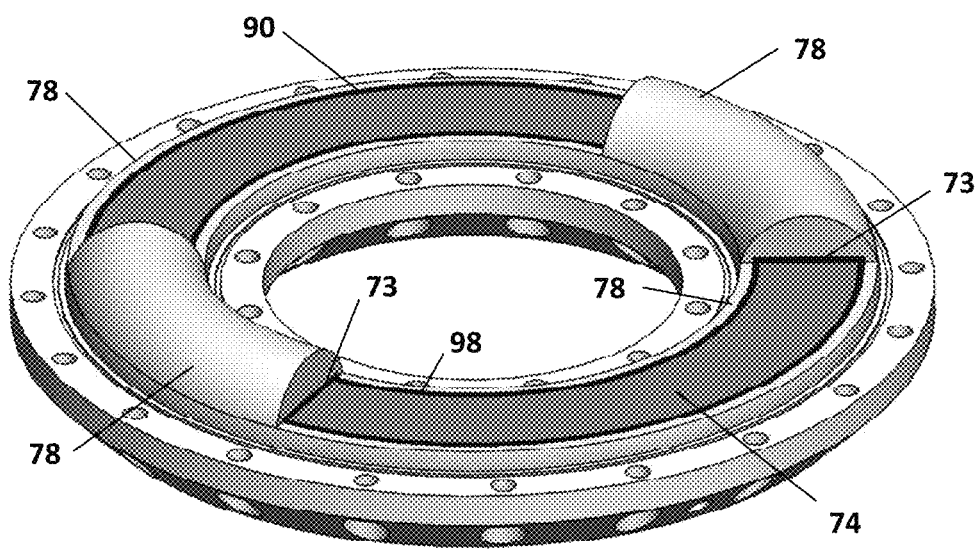
FIG. 8B is a partially schematic, three-dimensional illustration of the rotary device for axial flow of FIG. 8A with the top housing removed, exposing the rigid foam insulation, low-friction labyrinth seal plates, and the rotating wheel.
Figure 8C:
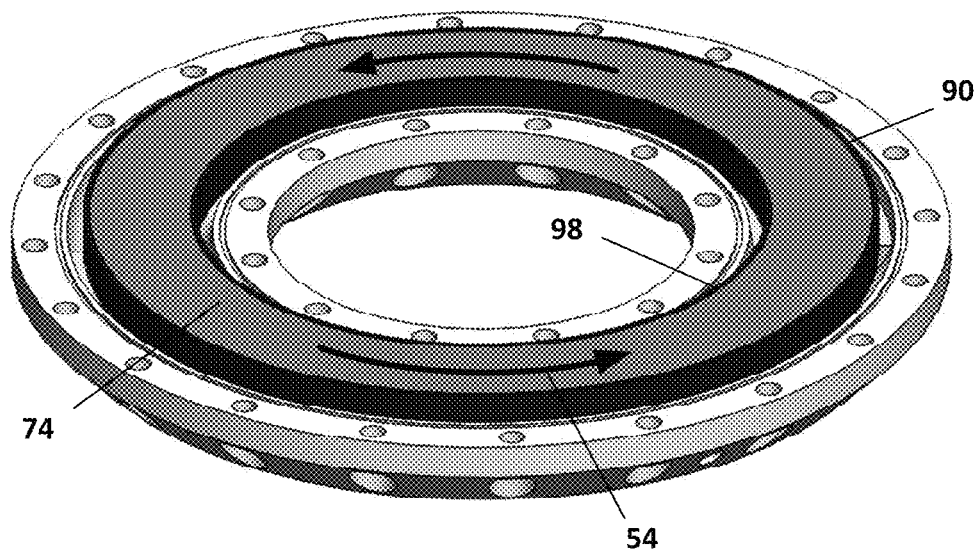
FIG. 8C is a partially schematic, three-dimensional illustration of a rotary device for axial flow of FIGS. 8A and 8B with the housing top and rigid foam insulation removed, exposing low-friction internal and external labyrinth seal plates that mate with the rotating wheel.
Figure 9A:
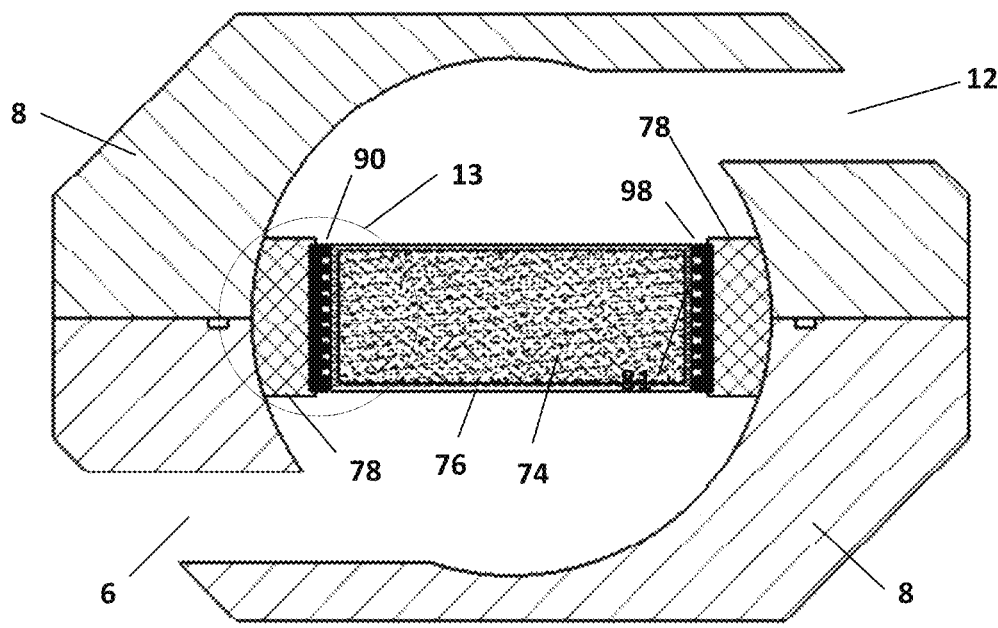
FIG. 9A is a partially schematic, cross-section illustration taken along line 7 of FIG. 8A, showing the rotary device for axial flow in the heat transfer fluid flow region with housing, heat transfer fluid ports, insulation, labyrinth seal, and rotating bed components shown.
Figure 9B:
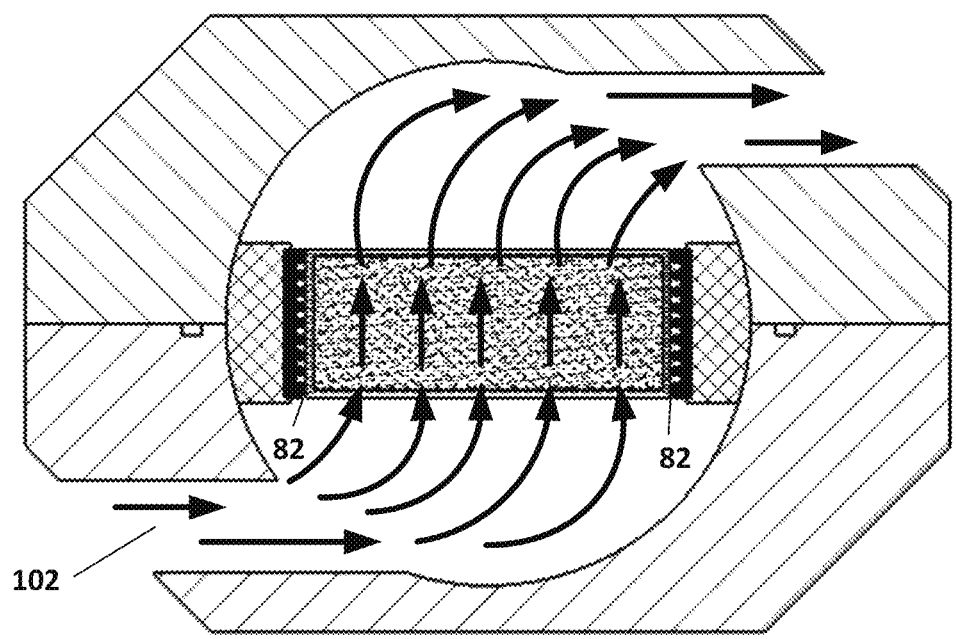
FIG. 9B is a partially schematic, cross-section illustration taken along line 7 of FIG. 8A, showing the rotary device for axial flow in the heat transfer fluid flow region with the fluid flow pathways and directions illustrated.

FIG. 8 illustrates an axial flow device design beginning with FIG. 8A where the stationary housing 8 (G-10 or like material) is depicted with the heat transfer fluid inlet ducts 6 and 24. FIG. 2B shows the axial flow design with the top housing removed exposing the rigid foam insulation 78 that will wrap around the interior and exterior components to limit parasitic heat leak from outside of the housing and to prevent any passage of leaked fluid circumferentially within the housing 8. Rigid foam insulation 78 is also shown in the no-flow region 20 of the axial flow design. FIG. 8B also shows the internal 98 and external 90 labyrinth seals for the axial design and the top labyrinth seals 73 of the no-flow region 20. FIG. 8C has the rigid foam insulation 78 and top labyrinth seals 73 removed and shows the rotation direction 54 of the torus and the internal 98 and external 90 labyrinth seals.

FIG. 9A shows a cross-sectional view taken along line 7 of FIG. 8A and shows the internal structure of the axial flow design in the flow region. Both external 90 and internal 98 labyrinth seal plates are shown. The porous rotating toroid 15 is shown with its low-friction coating layers 76 and 81, as well as the porous magnetocaloric regenerator material 74. FIG. 9B is the same cross-section as FIG. 9A and shows the direction of axial flow 102 through the flow region of the axial flow designed device. Flow enters through inlet duct one 6 and penetrates the porous, low-friction sides 76 of the rotating regenerator 15, either picks up heat from or leaves heat in the magnetocaloric material 74 and exits through outlet duct one 12. Potential leak paths are denoted at 82.

Figure 10:
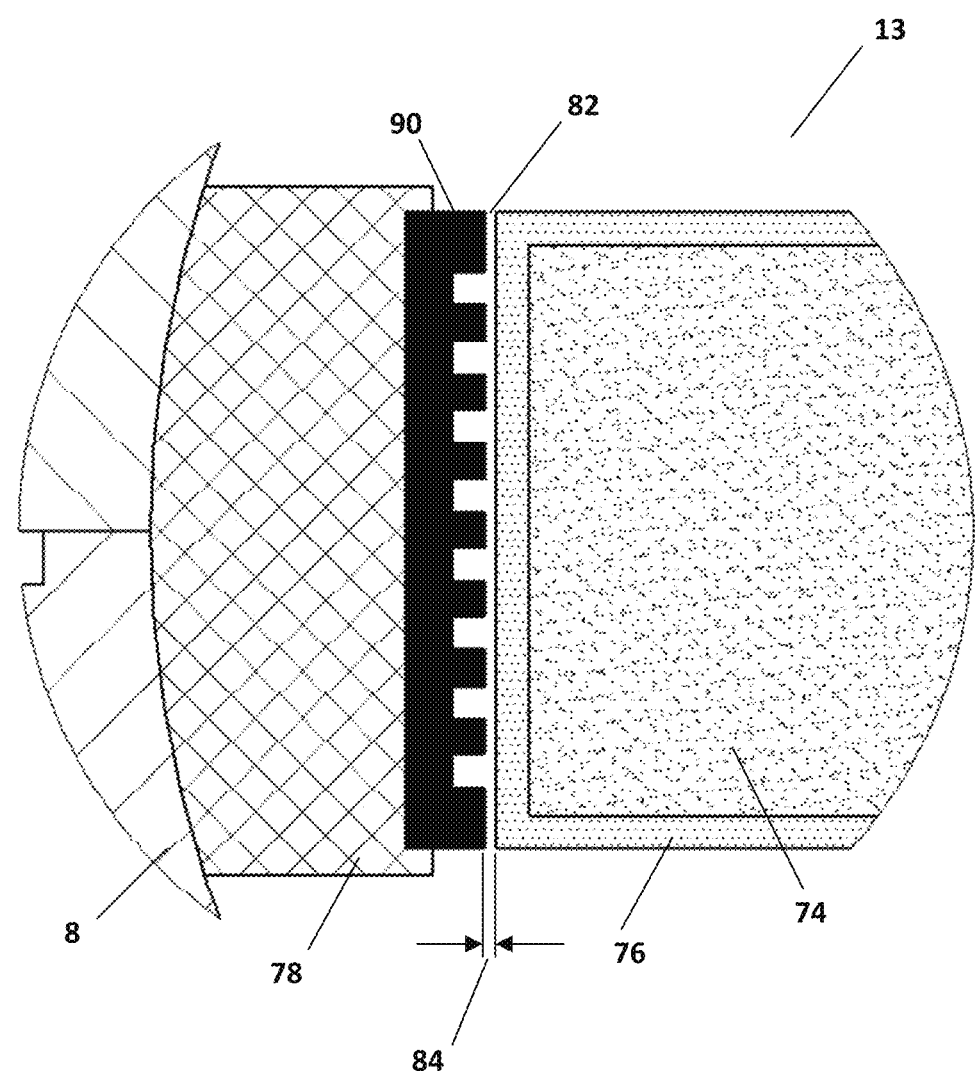
FIG. 10 is a partially schematic, detailed view of one embodiment of a labyrinth seal construction in the flow region of the axial flow device where it mates with the rotating bed.
Figure 11:
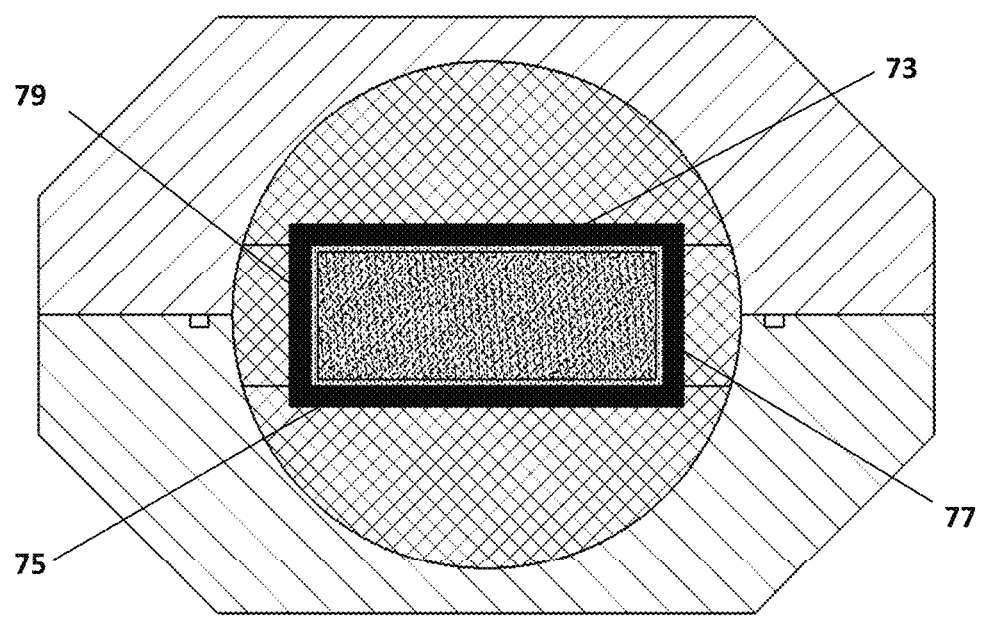
FIG. 11 is a partially schematic, cross-section illustration taken along line 9 of FIG. 8A of the rotary device for axial flow in the no-flow region with labyrinth seals for preventing heat transfer fluid leakage in circumferential directions shown.
Figure 12A:
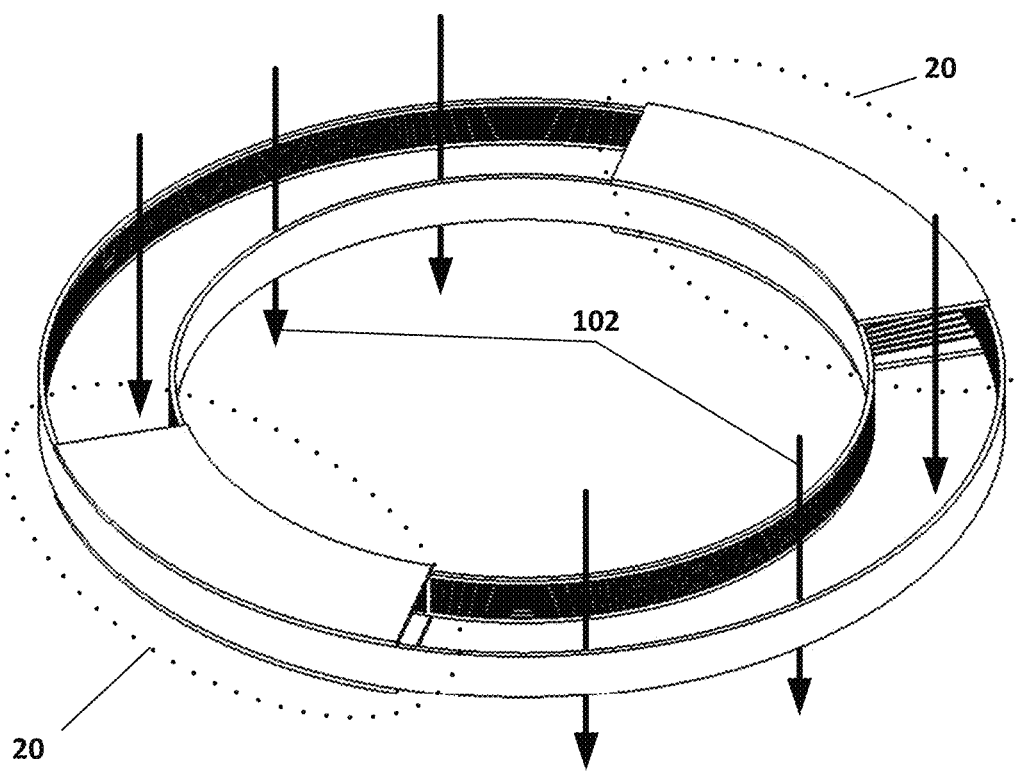
FIG. 12A is a partially schematic, three-dimensional illustration of labyrinth seal plates in a rotary device for axial flow with the direction and pathway of heat transfer fluid flow and the no-flow regions shown.
Figure 12B:
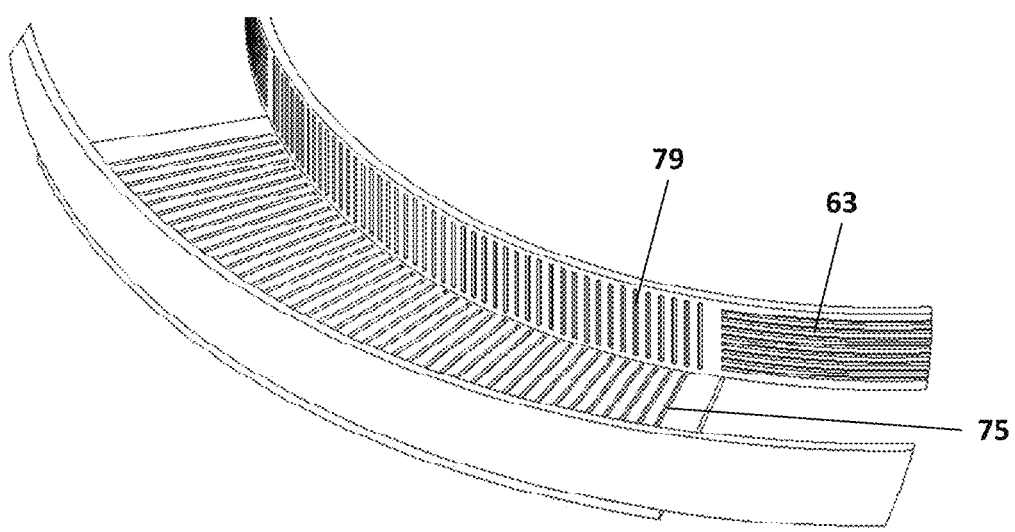
FIG. 12B is a partially schematic, three-dimensional illustration of one embodiment of labyrinth seal plates in a rotary device for axial flow with the orientation of the labyrinths in the flow and no-flow regions shown.

FIG. 10, like FIG. 4, shows a detail view 13 of the axial flow region external labyrinth seal 90. FIG. 11, like FIG. 5, shows a cross-sectional view taken along line 9 of FIG. 8A showing the no-flow region 20 in the axial flow design with top 73 and bottom 75 labyrinth seals for the no-flow region 20 and internal 79 and external 77 seals for the no-flow region 20 shown. Here, the orientation of the labyrinth structure is perpendicular 60 (parallel to the cross-section 9 cut) to potential circumferential leakage 66 and rigid foam insulation 78 fully fills any voids around the seal to prevent leakage outside of the labyrinth seal channel. FIG. 12A shows, with the rotating torus 15 removed from the illustration, the primary flow direction 102 of the heat transfer fluid through the axial flow designed device. The enclosed section in the no-flow region 20 is shown in more detail in FIG. 12B where the orientation of the labyrinth structure 79 and 75 are shown to prevent leakage 66 in the no-flow region shown as well as the proper orientation 63 to prevent leakage around the vertical sides of the rotating torus.

The simultaneous adjustability of the gap clearance between the top and bottom stationary seals and the rotating regenerator surfaces can be achieved by changing the pressure of a thin bladders under the stationary seals at different locations around the wheel. The bladders provide an adjustable pressure for the top and bottom seal surfaces as the wheel dimensions change due to realistic manufacturing and assembly tolerances. The rotating wheel holding the porous regenerative wheel is supported by at least three rollers on the bottom surface. Two rollers are in one no-flow region of the cavity and the other is in the opposite no-flow region. Three rollers provide enough contact points to establish a rotating plane. These rollers are shaped such that there is no slip between the roller and the rotating surface by changing the diameter, and subsequently the circumference of the roller so that the distance the inside edge of the roller rolls per rotation is proportional the distance the outer edge rolls per rotation. Large surface and volume seals that will be specifically designed for low-friction, low-contact, and engineered pressure drops via labyrinth patterns will produce a well-sealed rotating device with low-leakage and low-friction. As discussed above, the rotary designed Active Magnetic Regenerative Refrigerator/Liquefier has many advantages over the common reciprocating design including reduce cost in construction and operation for more cooling power. This patent addresses key component in a successful rotating design: a low-friction, low-leak seal to manage fluid flow in radial, axial, and circumferential directions.

The various devices and components are illustrated in the accompanying figures and described above with reference to identifiers as follows:

2—HTF* Entering Device at $T_{hot}$
3—Section A Used in FIGS. 3A & 3B
4—Low Magnetic Field Region
5—Section B Used in FIG. 5
6—HTF Inlet Duct One
7—Section C Used in FIGS. 9A & 9B
8—Rotary AMRR Housing
9—Section D Used in FIG. 11
10—Hot to Cold Flow Region
11—Detail View of Labyrinth Design in 3A Shown in FIG. 4
12—HTF Outlet Duct One
13—Detail View of Labyrinth Design in 9A Shown in FIG. 10
14—Cold Heat Exchanger for Reject Heat from Colder AMRR Stage
15—Torus with Low-friction Coating and Internal Porous Regenerators
16—HTF from Colder Stage Carrying Reject Heat from Colder Stage
17—HTF Leaves Cold Edge of Device at Temperature $T_{cold}-\Delta T_{cold}$
18—Cooled HTF Fluid for Colder Stage
19—HTF reenters device at $T_{cold}$
20—No HTF Flow Region
22—High Magnetic Field Region
24—HTF Inlet Duct Two 26—Cold to Hot Flow Region
28—HTF Outlet Duct Two
30—HTF Exiting Device
31—HTF Leaves Hot Edge of Device at Temperature $T_{hot}$+ $\Delta T_{hot}$
32—Bypass Flow
34—Bypass Heat Exchanger for Cooling Process Stream
36—Process Stream Enters at Stage's Hot Temperature
38—Process Stream Exits at Stage's Cold Temperature
40—Bypass Control Valve
42—Bypass Return Flow
44—Bypass Check Valve
46—HTF Pump
48—Cold Heat Exchanger for Rejecting Heat from this Stage to Warmer Stage
50—Cooler HTF from Warmer Stage to Pick up Reject Heat from this Stage
52—HTF Carrying Reject Heat to Warmer Stage
54—Direction of Porous Bed Rotation
56—Drive Motor and Gears
58—Housing Bolts
60—Orientation of Labyrinths in the Two No-Flow Regions
62—Orientation of Labyrinths in the Two Flow Regions of the Radial Flow Design
63—Orientation of Labyrinths in the Two Flow Regions of the Axial Flow Design
64—Direction of Radial Leakage the Labyrinth Prevents in the Two Flow Regions
66—Direction of Circumferential Leakage the Labyrinth Prevents in the Two No-Flow Regions
70—Bottom Labyrinth Seal for Radial Flow Design
72—Top Labyrinth Seal for Radial Flow Design
73—Top Labyrinth Seal in No-Flow Region
74—Rotating Porous Regenerator
75—Bottom Labyrinth Seal in No-Flow Region
76—Porous Low Friction Coating
77—External Labyrinth Seal in No-Flow Region
78—Rigid Cryogenic Foam Insulation
79—Internal Labyrinth Seal in No-Flow Region
80—Direction of HTF Flow Through Radial Flow Design
81—Non-porous Low-friction Coating
82—Potential HTF Leak Path
83—Labyrinth Rib Width
84—Seal Clearance Gap
85—Labyrinth Channel Width
87—Labyrinth Channel Depth
90—External Labyrinth Seal for Axial Flow Design
92—Compression of Leaking Fluid
94—Fluid Leakage Through Gap
96—Expansion of Leaking Fluid
98—Internal Labyrinth Seal for Axial Flow Design
102—Direction of HTF Flow Through Axial Flow Design

*HTF=Heat Transfer Fluid

In the description provided herein, the term "about" means+/−20% of the indicated value or range unless otherwise indicated. The terms "a" and "an," as used herein, refer to one or more of the enumerated components or items. The use of alternative language (e.g., "or") will be understood to mean either one, both or any combination of the alternatives, unless otherwise expressly indicated. The terms "include" and "comprise" and "have" are used interchangeably and each of these terms, and variants thereof, are intended to be construed as being non-limiting.

It will be appreciated that the methods and systems of the present invention may be embodied in a variety of different forms, and that the specific embodiments shown in the figures and described herein are presented with the understanding that the present disclosure is considered exemplary of the principles of the invention and is not intended to limit any claimed subject matter to the illustrations and description provided herein. The various embodiments described may be combined to provide further embodiments. The described devices, systems, methods and compositions may omit some elements or steps, add other elements or steps, or combine the elements or execute steps in a different combination or order than that specifically described.

We claim:

1. An active magnetic regenerative refrigerator or liquefier apparatus comprising: a stationary housing providing an interior cavity configured to retain a rotating toroidal mass under pressure and having at least one fluid inlet and at least one fluid outlet; a rotatable porous magnetic regenerative bed in the form of a toroidal mass positioned within the interior cavity, wherein the porous magnetic regenerative bed is configured to have at least one fluid flow region in which pressurized fluid flows through the toroidal mass during operation of the apparatus; and at least one labyrinth seal element located in proximity to an external surface of the toroidal mass in the at least one fluid flow region, wherein the at least one labyrinth seal element comprises a plurality of grooves oriented to form fluid flow pathways in at least one of an axial, radial and/or circumferential direction, and wherein the apparatus is configured to maintain a gap between fixed elements of the at least one labyrinth seal element and the toroidal mass during operation of the apparatus.

2. The apparatus of claim 1, wherein the at least one labyrinth seal element comprises a plurality of grooves oriented perpendicular to the direction of pressurized fluid flow.

3. The apparatus of claim 1, wherein the at least one labyrinth seal element comprises a plurality of grooves oriented circumferentially.

4. The apparatus of claim 1, wherein the at least one labyrinth seal element is stationary and comprises grooves and projections facing the toroidal mass in fluid flow regions.

5. The apparatus of claim 1, wherein the direction of pressurized fluid flow in the at least one fluid flow region is radial and further comprising at least a first labyrinth seal element located in proximity to an upper external surface of the toroidal mass in the fluid flow region and at least a second labyrinth seal element located in proximity to a lower external surface of the toroidal mass in the fluid flow region.

6. The apparatus of claim 5, wherein the first and second labyrinth seal elements each comprise a plurality of grooves oriented in circumferential pathways.

7. The apparatus of claim 1, wherein the direction of pressurized fluid flow in the at least one fluid flow region is axial and further comprising at least a first labyrinth seal element located in proximity to an outer side wall surface of the toroidal mass in the fluid flow region and at least a second labyrinth seal element located in proximity to an inner side wall surface of the toroidal mass in the fluid flow region.

8. The apparatus of claim 7, wherein the first and second labyrinth seal elements each comprise a plurality of grooves oriented in a circumferential pathway.

9. The apparatus of claim 1, wherein the porous magnetic regenerative bed is configured to have at least one no fluid flow region in which pressurized fluid is prevented from flowing through the toroidal mass during operation of the apparatus.

10. The apparatus of claim 9, additionally comprising at least one labyrinth seal element located in proximity to an external surface of the toroidal mass in the at least one no fluid flow region, wherein the labyrinth seal element comprises a plurality of grooves.

11. The apparatus of claim 10, wherein the grooves are oriented radially.

12. The apparatus of claim 11, additionally comprising labyrinth seal elements located in proximity to each external surface of the toroidal mass in the at least one no fluid flow region.

13. The apparatus of claim 12, wherein grooves in labyrinth seal elements located in proximity to external side wall surfaces of the toroidal mass are oriented vertically and grooves in labyrinth seal elements located in proximity to upper and lower external surfaces of the toroidal mass are oriented radially.

14. The apparatus of claim 1, wherein at least two external surfaces of the toroidal mass comprise low friction surfaces.

15. The apparatus of claim 14, wherein the low friction surfaces comprise a resin-based composite material.

16. The apparatus of claim 1, wherein all external surfaces of the toroidal mass comprise low friction surfaces.

17. An active magnetic regenerative refrigerator or liquefier apparatus comprising: a stationary housing providing an interior cavity configured to retain a rotating toroidal mass under pressure and having at least one fluid inlet and at least one fluid outlet; a rotatable porous magnetic regenerative bed in the form of a toroidal mass positioned within the interior cavity, wherein the porous magnetic regenerative bed is configured to have at least one fluid flow region in which pressurized fluid flows through the toroidal mass during operation of the apparatus; and at least one labyrinth seal element located in proximity to an external surface of the toroidal mass in the at least one fluid flow region, wherein the at least one labyrinth seal element comprises a plurality of grooves oriented to form fluid flow pathways in at least one of an axial, radial and/or circumferential direction, wherein rigid cryogenic insulation provided within the interior cavity and positioned between an internal housing surface and an exterior surface of the toroidal mass.

18. An active magnetic regenerative refrigerator or liquefier apparatus comprising: a stationary housing providing an interior cavity configured to retain a rotating toroidal mass under pressure and having at least one fluid inlet and at least one fluid outlet; a rotatable porous magnetic regenerative bed in the form of a toroidal mass positioned within the interior cavity, wherein the porous magnetic regenerative bed is configured to have at least one fluid flow region in which pressurized fluid flows through the toroidal mass during operation of the apparatus; at least one labyrinth seal element located in proximity to an external surface of the toroidal mass in the at least one fluid flow region, wherein the at least one labyrinth seal element comprises a plurality of grooves oriented to form fluid flow pathways in at least one of an axial, radial and/or circumferential direction; and an inflatable bladder positioned in proximity to the at least one labyrinth seal element, wherein the inflatable bladder is configured to apply adjustable spring pressure to the at least one labyrinth seal element.

19. The apparatus of claim 17, wherein the rigid cryogenic insulation is stationary during operation of the apparatus and the at least one labyrinth seal element is mounted to the rigid cryogenic insulation.

20. The apparatus of claim 17, wherein rigid cryogenic insulation is positioned between the internal housing surface and the external surface of the toroidal mass to substantially eliminate any continuous fluid pathway within the interior cavity.

* * * * *